(12) United States Patent
Pala et al.

(10) Patent No.: US 12,008,286 B2
(45) Date of Patent: Jun. 11, 2024

(54) PERIPHERAL DEVICE WITH ACOUSTIC RESONATOR

(71) Applicant: Apple Inc., Cupertino, CA (US)

(72) Inventors: Sedat Pala, Sunnyvale, CA (US); Jere C. Harrison, San Diego, CA (US); Mi Hye Shin, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/055,702

(22) Filed: Nov. 15, 2022

(65) Prior Publication Data
US 2023/0161545 A1  May 25, 2023

Related U.S. Application Data

(60) Provisional application No. 63/264,351, filed on Nov. 19, 2021.

(51) Int. Cl.
| | |
|---|---|
| *G06F 3/16* | (2006.01) |
| *G06F 3/0354* | (2013.01) |
| *G06F 3/038* | (2013.01) |
| *G06F 3/041* | (2006.01) |
| *G06F 3/044* | (2006.01) |

(52) U.S. Cl.
CPC ............ *G06F 3/16* (2013.01); *G06F 3/03545* (2013.01); *G06F 3/0383* (2013.01); *G06F 3/04162* (2019.05); *G06F 3/0441* (2019.05); *G06F 3/0442* (2019.05)

(58) Field of Classification Search
CPC ........ G06F 3/016; G06F 3/0441; G06F 3/0442; G06F 3/04162; G06F 3/03545; G06F 3/0383
See application file for complete search history.

(56) References Cited

U.S. PATENT DOCUMENTS

| | | | |
|---|---|---|---|
| 6,573,833 B1 | 6/2003 | Rosenthal | |
| 9,229,542 B2 | 1/2016 | Krete | |
| 9,430,106 B1 | 8/2016 | Olsen et al. | |
| 10,268,273 B1 * | 4/2019 | Sundaram | G06F 3/0346 |
| 2005/0215907 A1 | 9/2005 | Toda et al. | |

(Continued)

OTHER PUBLICATIONS

Extended European Search Report received for European Patent Application No. 22208212.5, dated Mar. 16, 2023, 9 pages.

*Primary Examiner* — Lisa S Landis
(74) *Attorney, Agent, or Firm* — Kubota & Basol LLP

(57) ABSTRACT

Locating a lost stylus, or other peripheral input device can be made possible by acoustic resonators integrated within housing structures of the stylus. Acoustic resonators can be formed at an end of the stylus opposite its tip, and can include portions of the stylus outer housing that are thinned down to an engineered thickness that has a particular resonant behavior or frequency. In some examples, acoustic resonators can be formed at a cap portion of the stylus, and can include a resonant diaphragm attached to at least a portion of a cap boundary. Cap coverings for the cap portion can optionally have openings to allow ventilation for changes in air pressure generated beneath the covering. In some examples, an electronic device can communicate a location request to the stylus and can cause the stylus to generate an acoustic signal for a specified target detector using the acoustic resonators.

20 Claims, 9 Drawing Sheets

(56) References Cited

U.S. PATENT DOCUMENTS

2010/0270091 A1* 10/2010 Ding .................. G06F 3/03545
  178/19.02
2012/0062491 A1   3/2012 Coni et al.
2020/0404423 A1  12/2020 Dusan et al.

* cited by examiner

PERIPHERAL DEVICE WITH ACOUSTIC RESONATOR

CROSS-REFERENCE TO RELATED APPLICATION

This application claims the benefit of U.S. Provisional Application No. 63/264,351, filed Nov. 19, 2021, the content of which is incorporated herein by reference in its entirety for all purposes.

FIELD OF THE DISCLOSURE

This relates generally to peripheral devices with acoustic resonators and systems and methods of communicating a location of the peripheral device using vibrations from an acoustic resonator of the peripheral device.

BACKGROUND OF THE DISCLOSURE

Many types of input devices are presently available for performing operations in a computing system, such as buttons or keys, mice, trackballs, joysticks, touch panels, touch screens and the like. Touch screens, in particular, are popular because of their ease and versatility of operation as well as their declining price. Touch screens can include a touch panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch panel using a finger, stylus or other object at a location often dictated by a user interface (UI) being displayed by the display device. In general, touch screens can recognize a touch and the position of the touch on the touch panel, and the computing system can then interpret the touch in accordance with the display appearing at the time of the touch, and thereafter can perform one or more actions based on the touch. In some examples, touch panels can be included in other input devices that are separate from any display screen, such as trackpads. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Many types of peripheral input devices are presently used to provide input to electronic devices. Styluses have become popular peripheral input devices for touch-sensitive devices. In particular, use of an active stylus capable of generating stylus stimulation signals that can be sensed by the touch-sensitive device can improve the precision of stylus input. However, a peripheral input device used to interact with an electronic device may be misplaced.

SUMMARY OF THE DISCLOSURE

This relates to systems and methods for locating peripheral input devices such as styluses, as well as acoustic resonator(s) integrated within a housing of the peripheral input device. An electronic device can receive a request from a user, either directly or via a network, requesting assistance locating the peripheral input device. In response, the electronic device can generate a location request and communicate the request to the peripheral input device. In some examples, the location request generated at the electronic device can specify a target detector for a beacon, or acoustic signal generated by the peripheral input device. Sometimes, the target detector is specified by the user, although in some instances the electronic device can select itself as the target detector. In some examples, the location request also specifies a desired frequency, desired amplitude, and desired duration of the beacon, or acoustic signal generated by the peripheral device. In some examples, the desired frequency can be based on the specified target detector. As an example, if the target detector is a user, the desired frequency can be specified within an audible range of frequencies associated with human hearing (or, a sub-range thereof). Alternatively, if the target detector is an electronic device, the desired frequency can be specified within a range of frequencies associated with optimal detection, lower-power detection, or lower-noise detection for acoustic transducers (e.g., audio/microphone sensors) within the electronic device. In some examples, the desired frequency specified by the location request generated by the electronic device can be based on a user selection. In other examples, the desired frequency can be selected by the electronic device (e.g., automatically) from a range of frequencies based on the target detector without requiring a user selection for the desired frequency. In some examples, the desired amplitude of the beacon, or acoustic signal generated by the peripheral device can be selected (by a user, or the electronic device) so that the acoustic signal is audible to the target detector at a particular loudness level, a certain distance away. In some examples, the desired duration of the acoustic signal can be selected so that the target detector has sufficient time to detect the signal.

In response to receiving the location request, the peripheral input device can generate the acoustic signal for the target detector, at the frequency, amplitude, and for the duration specified in the location request. In some examples, the peripheral input device operates in a default mode associated with normal operations of the peripheral input devices, and in a beacon mode associated with generating acoustic signals for target detectors. In the default mode, a haptic module within the peripheral input device can generate haptic feedback for a user based on gestures, selections, or other actions performed with the peripheral input device. The peripheral input device can switch to the beacon mode in response to receiving the location request. In the beacon mode, processing circuitry of the peripheral input device can generate instruction signals for a haptic module such that it generates a drive signal, or harmonic forcing signal for acoustic resonators integrated within housing structures of the peripheral input device. The haptic module can vibrate to cause elastic deformation in housing structures it is mechanically coupled to, or to cause changes in air pressure in its surrounding area. In some examples, a peripheral input device has acoustic resonators integrated within its housing structures that are mechanically coupled to the haptic module. In some such examples, the drive signal generated at the haptic module can be transferred to the acoustic resonators through a path of material that mechanically couples the acoustic resonators to the haptic module. In some examples, a peripheral input device has acoustic resonators that are coupled to the haptic module via an air gap. In some such examples, the drive signal generated at the haptic module can be transferred to the acoustic resonators through changes in the air pressure in the air gap between the acoustic resonators and the haptic module.

In some examples, acoustic resonators integrated within the housing of the peripheral input device can include portions of an outer housing in an end/cap region of the device that are thinned to a thickness that is different from the thickness of the outer housing in other regions of the device. The thickness of the outer housing used to form the acoustic resonator can be selected or engineered to resonate at a particular frequency, when provided a corresponding drive signal from the haptic module. These acoustic resonators can receive the drive signal from the haptic module via a path through material used to form housing structures of the peripheral input device, by which such acoustic resonators and the haptic module are considered to be mechanically coupled. The thinned portions of the outer housing used to form the acoustic resonators are separated from the inner housing by an air gap, and are thereby capable of undergoing elastic deformation in response to receiving the drive signal from the haptic module. As a result, the acoustic resonators cause an acoustic signal to be generated via the outer housing itself, which improves detectability of the acoustic signal without the need to incorporate active speaker components.

In some examples, acoustic resonators that are coupled to the haptic module via an air gap can be resonant diaphragms attached to at least a portion of a boundary within a cap portion of the housing of the peripheral input device. The thickness of these resonant diaphragms can similarly be selected or engineered to resonate at a particular frequency, when provided a corresponding drive signal from the haptic module. These acoustic resonators can receive the drive signal from the haptic module via changes in the air pressure in the region between the acoustic resonators and the haptic module, caused by vibrations at the haptic module. In particular, these changes in the air pressure contacting one side of the resonant diaphragm can cause corresponding changes in air pressure to be generated on an opposing side of the resonant diaphragm (e.g., an acoustic signal). As a result, the acoustic resonators formed from such resonant diaphragms cause an acoustic signal to be generated at the cap portion of the housing. In some examples, a solid cap can completely cover the acoustic resonator. In some examples, an opening can be formed in the cap to form a Helmholtz resonator. In some examples, an opening can be formed from the cap volume to the internal peripheral device volume to form a Helmholtz resonator. In some examples, a perforated opening can be formed in the cap to form a Helmholtz resonator with increased bandwidth. In some examples, a perforated opening can be formed from the cap volume to the internal peripheral device volume to form a Helmholtz resonator with increased bandwidth. In other examples, an opening can be formed in the cap covering, to improve the ease of detecting the acoustic signal generated at the cap portion.

Once the peripheral input device generates the acoustic signal, the target detector can detect its location. In some examples, where the target detector is a user, the user can use the acoustic signal like a beacon, and follow the signal to its source by moving in a direction that corresponds to increasing loudness levels of the acoustic signal. In other examples, where the target detector is an electronic device, the electronic device can detect the acoustic signal using one or more acoustic transducers (e.g., audio/microphone sensor(s)). Based on a comparison, or difference between amplitude and/or phase and/or frequency values of the acoustic signals detected by the one or more acoustic transducers, and the amplitude and/or phase and/or frequency values of the acoustic signal specified in the location request, processing circuitry in the electronic device can estimate a distance to, or relative position of the peripheral input device. In some examples, processing circuitry in the electronic device can also consult a sound propagation model to estimate the relative distance of the peripheral input device from the electronic device. Based on a comparison between amplitude values of the acoustic signal sensed by a single acoustic transducer in the electronic device at different orientations, or between amplitude values of multiple acoustic transducers disposed at multiple different locations within the electronic device, processing circuitry in the electronic device can estimate a relative direction of the peripheral input device from the electronic device. Based on the estimated relative distance, and estimated relative direction, processing circuitry in the electronic device can estimate a position of the peripheral input device relative to itself, according to examples of the disclosure. Based on a comparison between phase of the measured acoustic signal relative to the requested acoustic signal sensed by a single acoustic transducer in the electronic device or between measured signal phase of multiple acoustic transducers disposed at multiple different locations within the electronic device, processing circuitry in the electronic device can estimate a relative position and/or direction of the peripheral input device from the electronic device according to examples of the disclosure. Relative position and direction of the peripheral input device can be combined with the absolute position and orientation of the electronic device within a space to calculate the position of the peripheral input device in that space, according to examples of the disclosure.

DETAILED DESCRIPTION

In the following description of examples, reference is made to the accompanying drawings which form a part hereof, and in which it is shown by way of illustration specific examples that are optionally practiced. It is to be understood that other examples are optionally used, and structural changes are optionally made without departing from the scope of the disclosed examples.

This relates to a peripheral device including an acoustic resonator and to systems and methods for communicating with a peripheral device that includes an acoustic resonator. An electronic device can cause the peripheral device to generate an acoustic signal using the acoustic resonator when the device is in communication with the peripheral device (e.g., using wireless communication protocols). In some examples, the acoustic signal generated by the peripheral device can have a particular associated frequency and/or a particular associated amplitude, which can optionally be specified by an electronic device that is communicatively coupled to the peripheral device. In some examples, the peripheral device generates haptic feedback signals in a first operating mode (e.g., a default operating mode) and generates the acoustic signal in a second, different operating mode. In some examples, the peripheral device can switch to the second operating mode for generating the acoustic signal in response to receiving a request from a communicatively coupled electronic device. In some examples, the peripheral device can generate an acoustic signal with particular frequencies and/or amplitudes based on a target detector for the acoustic signal. In some examples, the peripheral device generates an acoustic signal with a frequency within an audible frequency band associated with human hearing, or within a subset of the audible frequency band (e.g., when the target detector is a nearby user or an electronic device). In some examples, the peripheral device generates an acoustic signal with a frequency within a different frequency band, which may be inaudible (e.g., outside the audible frequency band associated with human hearing) but detectable by an electronic device (e.g., when the target detector is the electronic device). In some such examples, the different frequency band can correspond to a range of frequencies that an acoustic transducer within the electronic device can accurately/optimally detect or which reduce power consumption required to generate and/or detect the acoustic signal. In some examples, the acoustic resonator of the peripheral device can be integrated within or implemented as part of the peripheral device's housing. In some examples, the acoustic resonator is integrated within or implemented as part of a shaft portion of the peripheral device. In some examples, the acoustic resonator is integrated within or implemented as part of a cap portion of the peripheral device. In some examples, the peripheral device can be a stylus.

Figure 1:
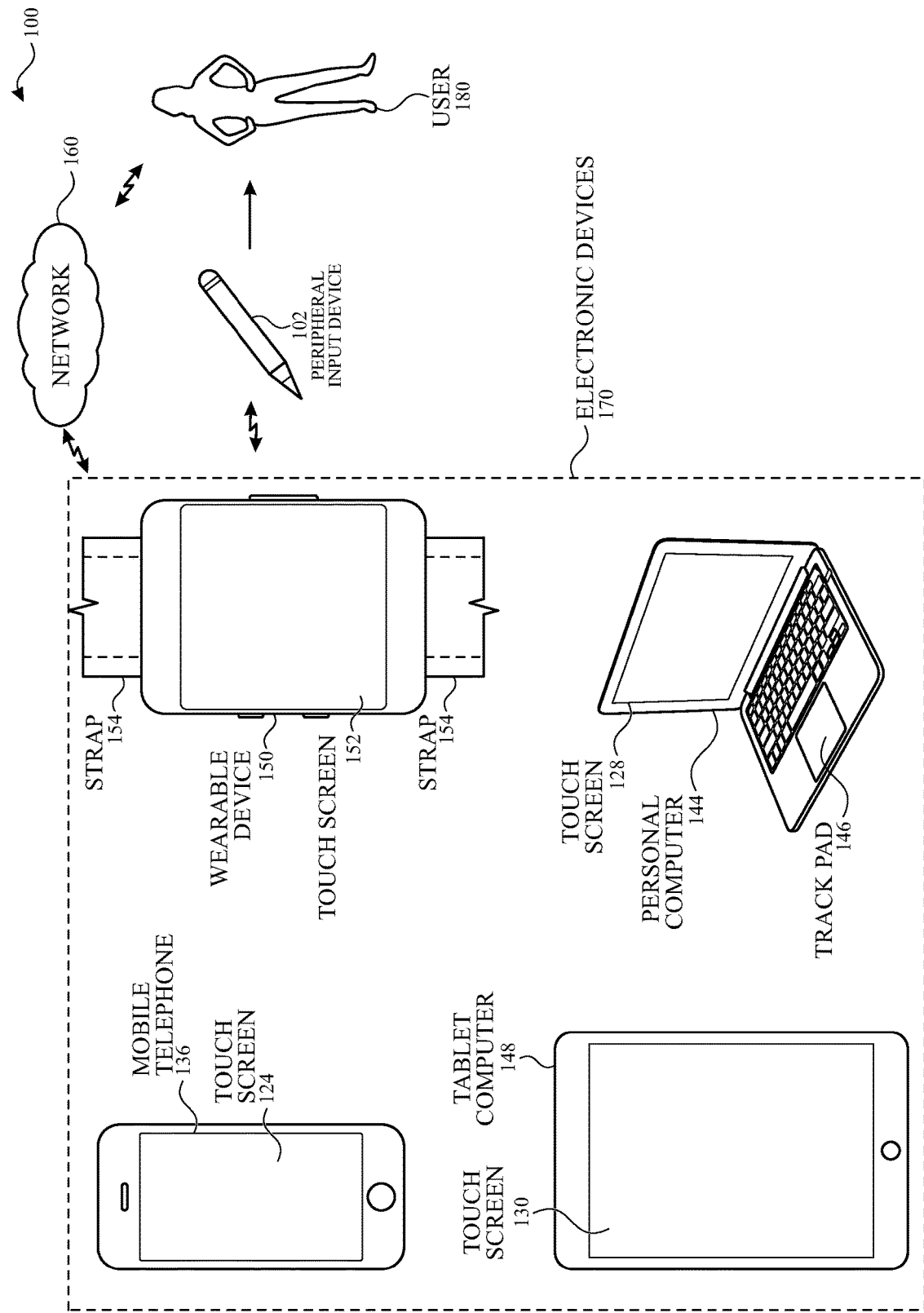
FIG. 1 illustrates an exemplary environment in which systems or devices are coupled with a peripheral input device and are responsive to inputs or requests from a user according to examples of the disclosure.

FIG. 1 illustrates an exemplary environment in which systems or devices can be communicatively coupled with a peripheral input device according to examples of the disclosure. In some examples, the systems or devices can be responsive to inputs or requests from a user. As described herein, a peripheral input device can include an acoustic resonator (e.g., integrated with or implemented as part of the housing or cap of the peripheral input device) that vibrates to generate an acoustic signal at a specified frequency and/or amplitude. In some examples, systems for determining the presence of the peripheral device or a location or a relative location of the peripheral device can request the peripheral input device to generate the acoustic signal. In some examples, the request to generate the acoustic signal can specify a desired frequency, a desired amplitude, and/or a desired target for the acoustic signal (e.g., a user, or an electronic device detector). In some examples, an electronic device can detect the acoustic signal and estimate the location of the peripheral device that generated the acoustic signal relative to the electronic device. In some examples, the electronic device can estimate a direction, position, and/or distance of the peripheral device relative to the electronic device. In some examples, the electronic device can estimate a relative position, and/or velocity of the peripheral device relative to the electronic device. In some examples, the estimate can be based on the detected acoustic signal, as well as the frequency and/or phase and/or amplitude of the acoustic signal specified in the request. In some examples, the electronic device causes the peripheral device to toggle between operating modes. In some examples, in a first mode (e.g., a default mode), the peripheral device does not generate an acoustic signal, and in a second mode (e.g., a beacon mode) the peripheral device generates an acoustic signal.

As illustrated in FIG. 1, an exemplary environment 100 includes a network 160 (e.g., a local area network, the Internet, etc.), electronic devices 170 that can be communicatively coupled with network 160, and a peripheral input device 102 that can communicatively couple to devices 170. In some examples, user 180 can generate a request using one of the electronic devices 170. The electronic devices can communicate the request to other electronic devices 170 via network 160. In some examples, network 160 represents an ad-hoc network between electronic devices 170, by which devices 170 can communicate with each other without requiring a separate network. In some examples, peripheral input device 102 can be communicatively coupled to network 160 (not shown). In some examples, peripheral input device 102 can be an input device for one of electronic devices 170 (e.g., a stylus). In some examples, peripheral input device 102 can be an active stylus that generates stylus stimulation signals when interacting with a touch-sensitive surface of an electronic device.

Electronic devices 170 can include an exemplary mobile telephone 136 that can include a touch screen 124 according to examples of the disclosure. Devices 170 can include an exemplary personal computer 144 that can include a touch screen 128 and/or a track pad 146 according to examples of the disclosure. Devices 170 can include an exemplary tablet computing device 148 that can include a touch screen 130 according to examples of the disclosure. Devices 170 can include an exemplary wearable device 150 (e.g., a watch)

that can include a touch screen 152 according to examples of the disclosure. Mobile telephone 136, personal computer 144, tablet computing device 148 and/or wearable device 150 and can include wireless communication circuitry and one or more acoustic sensors (e.g., an acoustic transducer, a microphone sensor, etc.). In some examples, the wireless communication circuitry within devices 170 can be used to communicate a request to peripheral device 102 for generating an acoustic signal. In some examples, the request can specify a desired frequency and/or a desired amplitude of the acoustic signal. In some examples, the request can also specify a desired target for detecting the acoustic signal (e.g., specifying devices 170 or user 180 as the intended target for detection of the acoustic signal).

In some examples, the acoustic sensor(s) within devices 170 can be used to detect the acoustic signal. The acoustic sensor(s) can detect frequencies within an audible range of frequencies associated with human hearing and/or frequencies outside the audible range. As an example, the acoustic sensor(s) can detect a frequency below the audible range. As another example, the acoustic sensor(s) can detect a frequency above the audible range. In some such examples, the acoustic sensor(s) can detect frequencies within the audible range with a first level of accuracy (e.g., a signal-to-noise ratio associated with detecting such frequencies, a rate of false-positive detections associated with detecting such frequencies) that can be different from a second level of accuracy associated with detecting frequencies outside the audible range using the acoustic sensor(s). As an example, the acoustic sensor(s) may detect frequencies outside the audible range with a higher level of accuracy than frequencies within the audible range.

Based on detecting the acoustic signal generated by peripheral input device 102 using the acoustic sensor(s), an electronic device 170 can detect the presence of peripheral input device 102, estimate a relative direction, relative position, and/or relative distance of peripheral input device 102, with respect to the orientation and/or position of the electronic device 170. In some examples, detecting the presence or estimating the relative direction/position/distance can be based on characteristics of the detected acoustic signal (e.g., frequency and/or phase and/or amplitude of the detected signal) as well as the frequency and/or amplitude of the acoustic signal specified in a request to generate the acoustic signal. In some such examples, the estimate can be generated by comparing the characteristics of the detected acoustic signal to the frequency and/or amplitude of the acoustic signal specified in the request communicated to peripheral input device 102. In some examples, estimating a direction or position of peripheral input device 102 relative to any of the devices 170 can require the detecting device to include and detect the acoustic signal with multiple acoustic transducers (e.g., microphone sensors, an array of acoustic/audio sensors, etc.), disposed at different respective locations within a single device. In some such examples, the device can generate an estimate for relative direction or relative position of peripheral input device 102 by comparing the acoustic signal detected by one acoustic transducer (e.g., first sensor data) to the acoustic signal detected by another acoustic transducer (e.g., second sensor data). As an example, if first sensor data indicates a higher detected amplitude corresponding to the acoustic signal than second sensor data, a device 170 can estimate a direction of peripheral input device 102 relative to device 170 that is closer to the location of the acoustic transducer that produced the first sensor data, than to the acoustic transducer that produced the second sensor data. This process can be repeated with multiple data samples from sensors positioned at different locations within device 170, to determine a relative direction of peripheral input device 102 from device 170. In some examples sensor data from multiple acoustic transducers disposed at different respective locations within a single device 170 can be compared to the specified signal using cross correlation or related trilateration techniques to calculate relative position by time of flight/arrival determinations (e.g., measuring a time interval between requesting an acoustic signal and detecting the acoustic signal). In some examples, sensor data from multiple acoustic transducers disposed at different respective locations within a single device 170 can be compared using cross correlation or related multilateration algorithms to calculate relative position by time difference of flight/arrival determinations (e.g., measuring time intervals between flight/arrival times of the detected acoustic signal at various pairs of the multiple acoustic transducers). In some examples, relative position calculated by device 170 using time of flight/arrival determinations can be compared with relative position calculated by device 170 from amplitude relative to a propagation model to improve calculated position accuracy. In some examples, relative position calculated by device 170 using time difference of flight/arrival determinations can be compared with relative position calculated by device 170 from amplitude relative to a propagation model to improve calculated position accuracy. In some examples, multiple devices of electronic devices 170 can be used to generate estimates for relative direction or relative position of peripheral input device 102, by correlating sensor data from their respective acoustic transducers to triangulate peripheral input device 102. In some examples, multiple devices of electronic devices 170 can be used to generate a single estimate for relative direction or relative position of peripheral input device 102, by comparing individual estimates by each device. Estimates by each device can, in some examples, be generated on the basis of comparisons between a requested acoustic signal (e.g., frequency, amplitude, and/or phase parameters specified in a request) and a received acoustic signal (e.g., frequency, amplitude and/or phase measurements from an acoustic transducer or other sensor). Comparisons between the requested acoustic signal and the received acoustic signal can be made in a time domain, or in a frequency domain. In some examples, an acoustic transducer or other sensor measures or records measurements for a received acoustic signal (e.g., an acoustic signal generated in response to a request) in a time domain. Optionally, processing circuitry of one or more electronic devices 170 can be used to transform time domain measurements of the received acoustic signal to a frequency domain (e.g., by Fourier transform, discrete Fourier transform, and/or fast Fourier transform techniques). In some examples sensor data from an acoustic transducer transformed to Fourier domain within a single device 170 can be compared to the specified signal transformed to Fourier domain using cross correlation or related multilateration algorithms to calculate relative velocity by frequency of arrival. In some examples, multiple devices of electronic devices 170 can be used to generate estimates for relative velocity of peripheral input device 102, by correlating sensor data from their respective acoustic transducers transformed to a frequency domain, and by using cross correlation or related multilateration algorithms to calculate velocity vector of peripheral input device 102 by frequency difference of arrival. In some examples, multiple devices of electronic devices 170 can be used to generate estimates for relative position and relative velocity of peripheral input device 102, by correlating sensor data from their respective acoustic transducers to triangulate peripheral input device 102. In other examples, relative position and/or direction and/or velocity of the peripheral input device 102 can be combined with the absolute position and/or orientation and/or velocity of electronic device(s) 170 in a space to estimate absolute position of peripheral input device 102 in a space.

Peripheral input device 102 can include an active stylus, or electronic pencil that uses wireless communication circuitry to communicate with any of electronic devices 170 (e.g., using wireless communication protocols). Additionally, peripheral input device 102 can provide input to a touch-sensitive surface (e.g., a touch screen) associated with any of electronic devices 170. As an example, a touch-sensitive surface integrated within any of devices 170 can display images and/or can detect touch and/or proximity (e.g., hover) events from peripheral input device 102. In some examples, devices 170 can perform touch scanning operations with its touch-sensitive surface using circuitry (not illustrated) that detects a path between a touch-down location of peripheral input device 102 (e.g., a location where device 102 first initiates contact with the touch-sensitive surface) and a lift-off location (e.g., a location where device 102 ceases contact with the touch-sensitive surface). As described in greater detail in connection with FIG. 3, peripheral input device 102 can generate stimulation signals that improve the accuracy of touch scanning operations and path detection associated with the devices 170. As described in greater detail below, peripheral input device 102 can include an acoustic resonator that generates an acoustic signal, sometimes in response to a request from one of the devices 170. In some examples, the request can specify a desired frequency of the acoustic signal, a desired amplitude of the acoustic signal, and/or a desired target for detecting the acoustic signal (e.g., user 180, one of devices 170, etc.). In some such examples, receiving the request at peripheral input device 102 can cause device 102 to generate an acoustic signal at the desired frequency and/or the desired amplitude, so that the acoustic signal can be detected by the desired target (e.g., user 180, one of devices 170, etc.).

In some examples, user 180 can request peripheral input device 102 to generate an acoustic signal, by initiating the request on one of electronic devices 170. In some examples, user 180 can use a separate device (another of the illustrated devices or another device that is not illustrated in FIG. 1) to convey the request to one of electronic devices 170 via network 160. User 180 can perceive acoustic signals within an audible range of frequencies associated with human hearing. Within the audible range of frequencies, user 180 can perceive acoustic signals within a subset (or, sub-range) of frequencies associated with heightened auditory perception, as described in greater detail in connection with FIG. 4. When user 180 requests peripheral input device 102 to generate the acoustic signal, the user can specify whether the target detector will be the user or one or more of devices 170. In addition to specifying the target detector for the acoustic signal generated by peripheral input device 102, user 180 can specify a desired frequency and/or a desired amplitude of the acoustic signal. In some examples, when the user 180 is the target detector, the user can be provided options to specify a desired frequency from within an audible range of frequencies associated with human hearing (or a sub-range of frequencies associated with heightened auditory perception). In other examples, when user 180 specifies one or more devices 170 as the target detector, the user can be provided options to specify a desired frequency from within a range of frequencies associated with the audio transducers of devices 170, which may be different than the audible range of frequencies. Although the examples described above involve the selection or specification of both a target detector and a desired by user 180, in some examples, user 180 need only select a target detector or the target detector may have a default setting in the absence of a user selection. In some such examples, one of devices 170 can automatically select and send a specific frequency from an appropriate frequency range based on the target detector selected by user 180. As an example, if the target detector is a user, one of devices 170 can automatically specify a frequency within an audible range of frequencies associated with human hearing (or a sub-range thereof), and communicate the specified frequency to peripheral input device 102 in a request. The automatically specified frequency can be a default frequency within the audible range of frequencies or determined based on some other determination (e.g., a sequence of frequencies within the audible range can be cycled through, in round-robin fashion). Alternatively, if the target detector is an electronic device, one of devices 170 can automatically specify a frequency within a range of frequencies associated with optimal detection, lower-power detection, or lower-noise detection for acoustic transducers (e.g., audio/microphone sensors) within the electronic device, and communicate the specified frequency to peripheral input device 102 in a request. As an example, the frequencies associated with optimal detection in the context of lower-power detection frequencies can correspond to frequencies identified (e.g., known a priori, or based on information collected by the device during calibration) to require minimal power levels to detect (e.g., frequencies that require less/minimal power levels to detect than the remainder of the frequency range). In the interest of succinct descriptions, these frequencies can be referred to as "lower-power" frequencies, to indicate that they represent frequencies that can be sensed with minimal power levels. As another example, the frequencies associated with optimal detection in the context of lower-noise detection frequencies can correspond to frequencies identified (e.g., known a priori, or based on information collected by the device during calibration) to produce favorable/required signal-to-noise (SNR) ratios during detection, or that are associated with suitably long intervals between false-positive detections at those frequencies (e.g., frequencies that can be detected at lower/minimal noise levels compared to the remainder of the frequency range). In the interest of succinct descriptions, these frequencies can be referred to as "lower noise" frequencies, to indicate that they represent frequencies that can be sensed with minimal noise levels. The automatically specified frequency can be a default frequency within the range of frequencies associated with the acoustic transducers, or determined based on some other determination (e.g., a sequence of frequencies within the range associated with the acoustic transducers can be cycled through, in round-robin fashion). Similarly, one of devices 170 can automatically specify an amplitude and/or duration of an acoustic signal and communicate those specifications to peripheral input device 102 in a request. In some examples, an amplitude can be automatically specified based on a desired loudness level of the acoustic signal to a target detector at a particular distance from peripheral input device 102. In some examples, a duration can be automatically specified based on a minimum duration of the acoustic signal required for reliable detection by the target detector. Although the examples described above relate to specifying a single target detector, in some examples, multiple target detectors can be specified. In some such examples, both user 180 and one or more of devices 170 can be specified as target detectors (e.g., by user 180, or as a default setting of one of devices 170). In some such examples, a frequency can be specified in a range of frequencies that overlaps both the audible range of frequency associated with human hearing and the range of frequencies associated with the acoustic transducer of the electronic devices 170 specified as target detectors.

It should be understood that the example devices 170 illustrated in environment 100 of FIG. 1 are provided by way of example, and other types of devices can include wireless communication circuitry and at least one acoustic sensor according to examples of the disclosure. For example, the devices can include devices worn on or placed into contact with a user's body. In other examples, the devices can include portable electronic devices (e.g., smartphones, digital media players, headphones, fitness trackers, etc.), or stationary electronic devices (e.g., servers, desktop computers, communication hubs, etc.). Additionally, although some of the devices 170 illustrated in environment 100 explicitly refer to touch screens, it is understood that the wireless communication circuitry and acoustic detector(s) described herein does not require a touch screen to request peripheral input device 102 to generate an acoustic signal or to detect the acoustic signal and estimate a relative position, a relative direction, and/or a relative distance between any particular device of electronic devices 170 and peripheral input device 102.

As described herein, wireless communication circuitry and acoustic detector(s) can be incorporated into the systems (e.g., electronic devices 170) to add functionality for communicating with peripheral input device 102 and detecting an acoustic signal generated by peripheral input device 102. In particular, the use of acoustic detector(s) as described herein can enable more accurate estimates of a relative position, a relative direction, and/or a relative distance between any of devices 170 and peripheral input device 102. In some examples, when multiple devices 170 are used to detect an acoustic signal generated by peripheral input device 102, the multiple devices can communicate sensor data from their respective acoustic detector(s) with one another (e.g., via network 160, an ad hoc network, etc.) to triangulate a relative position of peripheral input device 102 to the devices. In some examples, a single one of electronic devices 170 can include multiple acoustic transducers (e.g., an array of microphone/audio sensors) placed at different positions within the electronic device. In some such examples, the single electronic device 170 can compare signals detected by the multiple acoustic transducers corresponding to the acoustic signal generated by peripheral input device 102 (e.g., by sampling and storing sensor readings from the multiple acoustic transducers). Based on this comparison of signals, the electronic device 170 can estimate a direction of peripheral input device 102 relative to device 170. Wireless communication circuitry of electronic devices 170 can enable a request to generate an acoustic signal to be conveyed from at least one of the devices 170 to peripheral input device 102. The request can specify a target detector (e.g., a device 170, user 180, etc.), a desired frequency for the acoustic signal (sometimes based on the target detector), and/or a desired amplitude for the acoustic signal. Peripheral input device 102 can include an acoustic resonator that can be mechanically excited to vibrate in a manner that generates the requested acoustic signal at the desired frequency and the desired amplitude based on the request. Peripheral input device 102 can include an acoustic resonator with perforations or openings to form a Helmholtz resonator with greater bandwidth than a sealed cavity, that can be mechanically excited to vibrate in a manner that generates the requested signal at the desired frequency and amplitude based on the request. By incorporating and integrating an acoustic resonator capable of generating an acoustic signal into peripheral input device 102, environment 100 can enable the presence of peripheral input device 102 to be detected by a target detector and/or a location, a direction, and/or a distance of peripheral input device 102 to be estimated by a target detector without requiring a separate component capable of generating an electronic location beacon (e.g., a GPS module, Bluetooth module, etc.) to be provided on peripheral input device 102. Additionally, environment 100 can simplify integration of components for tracking or locating into peripheral input device 102 by integrating an acoustic resonator, which can require less power to generate an acoustic signal compared to other electronic location beacons, and can occupy less space within the device than components for generating the electronic location beacons (at least because the acoustic signal generating resonators are integrated into portions of the housing).

Figure 2:
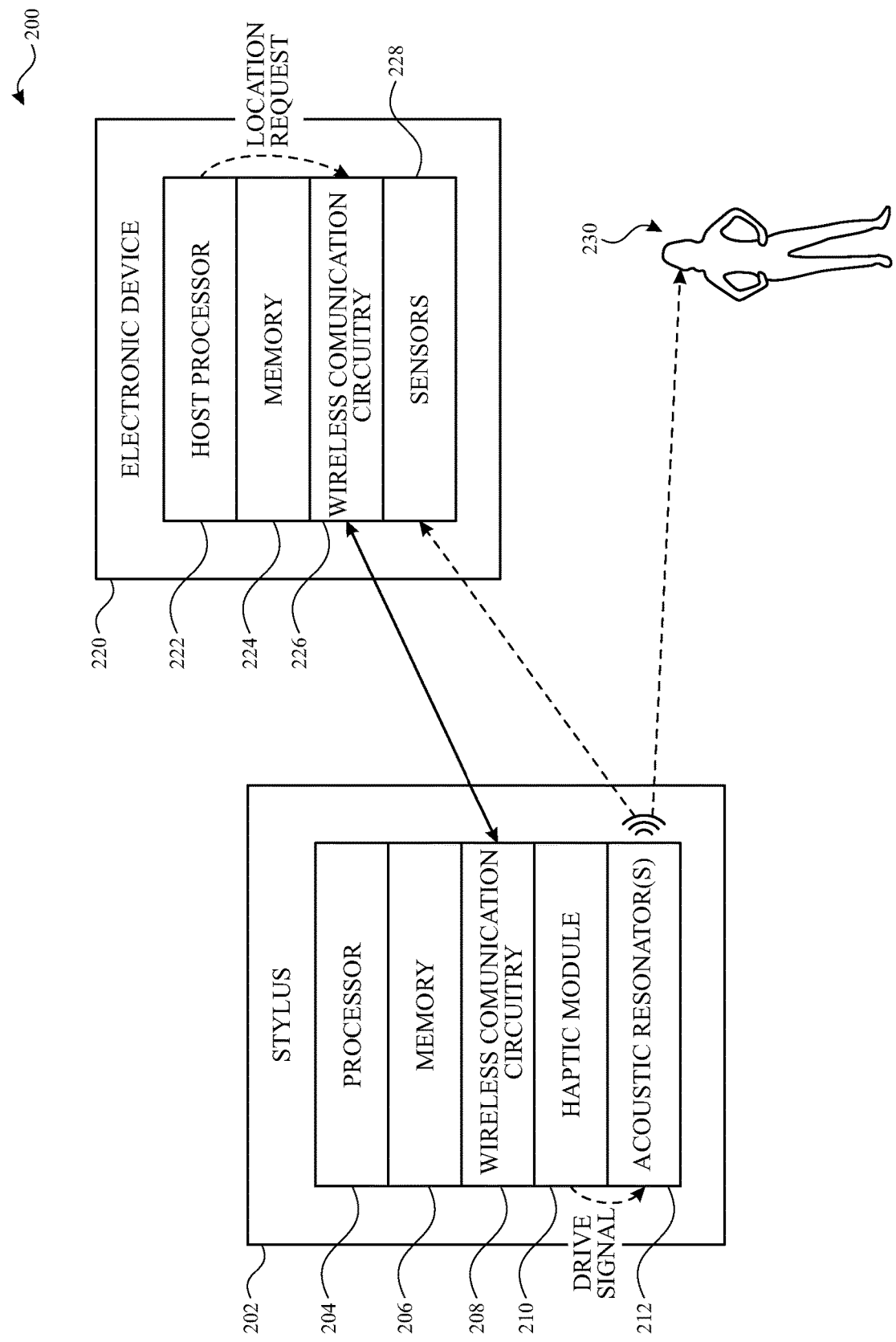
FIG. 2 illustrates block diagrams of an exemplary peripheral input device that communicates with an exemplary electronic device, or a user according to examples of the disclosure.

FIG. 2 illustrates block diagrams of an exemplary peripheral input device and an exemplary electronic device according to examples of the disclosure. Computing environment 200 can include stylus 202 and electronic device 220. Electronic device 220 can correspond to devices 130, 136, 144, or 150 of electronic devices 170 above illustrated in FIG. 1 (or may be implemented in other wearable or non-wearable electronic devices). Stylus 202 can include a processor 204 (or more than one processor, sometimes referred to as "processing circuitry") programmed to (configured to) execute instructions and to carry out operations associated with devices in computing environment 200. Processor 204 can be a single-chip processor (e.g., an application specific integrated circuit) or can be implemented with multiple components/circuits. For example, using instructions or a request received via wireless communication circuitry 208, processor 204 can control haptic module 210 to vibrate acoustic resonator(s) 212 to produce an acoustic signal.

Stylus 202 can also include memory 206 for storing various instructions for controlling haptic module 210 to vibrate acoustic resonator(s) 212 to produce an acoustic signal, in accordance with the instructions/requests received via wireless communication circuitry 208. Memory 206 can generally store data used by stylus 202. Memory 206 can be any non-transitory computer-readable storage medium. By way of example, memory 206 can include Read-Only Memory (ROM), Random-Access Memory (RAM), hard disk drive and/or the like. Instructions from memory 206 can be retrieved and executed, in response to receiving a request or instructions to generate an acoustic signal via circuitry 208. As an example, memory 206 can include instructions for operating stylus 202 in a default operating mode where acoustic resonators 212 can be inactive or silent (e.g., not vibrating to generate an acoustic signal). In the default operating mode of stylus 202, haptic module 210 can provide haptic feedback based on activity associated with stylus 202 and/or instructions/requests from electronic device 220 received via wireless communication circuitry (e.g., a request to provide haptic feedback in response to detecting a gesture performed by stylus 202). As another example, memory 206 can include instructions for operating stylus 202 in a beacon mode, where acoustic resonators 212 can vibrate to generate an acoustic signal (e.g., by a mechanical driving signal/impulse provided by haptic module 210). Processor 204 can retrieve instructions for operating stylus 202 in either the default mode or the beacon mode, and can execute instructions associated with the modes at different respective intervals. As an example, during an interval where stylus 202 operates in the default mode, processor 204 can retrieve instructions for operating stylus 202 in the default mode from memory 206. As another example, during an interval following the receipt of a request/instructions to generate an acoustic signal from electronic device 220, processor 204 can retrieve instructions for operating stylus 202 in the beacon mode from memory 206.

Wireless communication circuitry 208 within stylus 202 can include a WiFi module, a Bluetooth module, a Wireless Direct module, an infrared (IR) module, a radio-frequency (RF) module, or any other suitable wireless communication module that is compatible with at least one communication protocol supported by wireless communication circuitry 226 within electronic device 220. In some examples, wireless communication circuitry 208 within stylus 202 can communicate with electronic device 220 by receiving requests/instructions from device 220 over a communication channel established between them (illustrated by the bi-directional arrow between wireless communication circuitry 208 in stylus 202 and wireless communication circuitry 226 in electronic device 220). In some examples, wireless communication circuitry 208 can also communicate with electronic device 220 by sending confirmation messages indicating receipt of the requests/instructions (e.g., as part of a handshake process associated with the communication channel between stylus 202 and device 220).

Haptic module 210 within stylus 202 can be controlled by processor 204 to vibrate at a particular frequency, with a particular intensity/amplitude, and/or for a particular duration. As an example, when stylus 202 is operated in a default mode, processor 204 can retrieve and execute instructions from memory 206 corresponding to the default mode, and cause/control haptic module 210 to generate haptic feedback consisting of vibrations at particular frequencies and/or particular amplitudes, for a particular duration. As an example, vibration frequencies associated with haptic feedback are typically less than approximately 500 Hz, such as between 80-300 Hz. The specific/particular frequencies, amplitudes and durations of the haptic feedback generated by haptic module 210 can be generally specified by instructions stored in memory 206, but can alternatively be determined in real-time (e.g., when the haptic feedback corresponds to detected gestures or inputs associated with stylus 202).

As another example, when stylus 202 is operated in a beacon mode, processor 204 can retrieve and execute instructions from memory 206 corresponding to the beacon mode, and cause/control haptic module 210 to generate an acoustic signal by vibrating acoustic resonator(s) 212 at particular frequencies and/or particular amplitudes, for a particular duration. As an example, vibration frequencies associated with an acoustic signal can be between 1 kHz-20 kHz. This range (1 kHz-20 kHz) can sometimes be referred to as the audible range of frequencies associated with human hearing. This range can further refer to the range of frequencies used by the stylus 202 to generate acoustic signals in response to receiving a request specifying a user as the target detector for the acoustic signal. As discussed in greater below, in connection to FIG. 4, stylus 202 can use a frequency within a subset (or sub-range) of the audible range of frequencies associated with human hearing to generate an acoustic signal when a user (or electronic device) is the target detector for the acoustic signal. As an example, this sub-range can be 1 kHz-4 kHz, 1 kHz-5 kHz, 1 kHz-6 kHz, 2 kHz-5 kHz, 2 kHz-6 kHz, 2 kHz-7 kHz, or any other suitable range of frequencies within the audible range of frequencies associated with human hearing, spanning any size frequency band (e.g., a 3 kHz wide range of frequencies, 4 kHz wide range, 5 kHz wide range, etc.). The specific/particular frequencies, amplitudes and durations of the acoustic signal generated by acoustic resonator(s) 212, and the corresponding drive signals provided to haptic module 210 to cause the acoustic signal to be generated, can be generally specified by instructions stored in memory 206. In some examples, the specific frequencies, amplitudes, and durations of the acoustic signal can be determined based on a technical specification or requirement associated with a beacon protocol. In other examples, the specific frequencies, amplitudes, and durations of the acoustic signal can be specified in a request to generate the acoustic signal received at wireless communication circuitry 208 (e.g., from wireless communication circuitry 226 of device 220).

As mentioned above, acoustic resonator(s) 212 can receive a drive signal from haptic module 210 and can vibrate to generate an acoustic signal. Sometimes, the drive signal can be referred to as a harmonic forcing signal/impulse. In general, the acoustic resonator(s) 212 can be mechanically coupled to haptic module 210 by intervening structures that form a continuous path of material between a portion/end of haptic module 210 to any one of the acoustic resonator(s) 212. Vibrations generated at haptic module 210 can be conveyed, transmitted, or otherwise transmitted through such intervening structures to vibrate the acoustic resonator(s) 212. In this manner, the vibrations generated at haptic module 210 can be treated like a drive signal that propagate through the intervening structures that mechanically couple resonator(s) 212 to module 210 and ultimately cause acoustic resonator(s) to vibrate. A particular frequency, amplitude, and duration of vibration at the haptic module can be transmitted to acoustic resonator(s) 212, causing resonator(s) 212 to vibrate at a corresponding frequency and amplitude for the particular duration. In some examples, the corresponding frequency and amplitude of vibration at acoustic resonator(s) 212 can be different from the particular frequency and amplitude at haptic module 210 (e.g., due to transmission losses of the drive signal through the intervening mechanical structures that mechanically couple haptic module 210 to acoustic resonator(s) 212). However, to simplify the following discussions, it may be assumed that the particular frequency, amplitude, and/or duration of the vibrations at haptic module 210 are equivalent to the corresponding frequency, amplitude and/or duration of the vibrations at acoustic resonator(s) 212 (e.g., the drive signal does not suffer from transmission losses through the mechanical coupling of module 210 to resonator(s) 212).

Acoustic resonator(s) can be disposed at particular locations within stylus 202 or can be formed from portions of a housing for stylus 202 (not illustrated in FIG. 2). As discussed in greater detail below, acoustic resonator(s) can be integrated within a housing for stylus 202. In some examples, acoustic resonator(s) are integrated within a shaft portion of the stylus. In some such examples, haptic module 210 can mechanically couple to acoustic resonator 212 via intervening structures that form a path from material in the housing between module 210 and resonator 212 integrated within the shaft portion. In some examples, such as when the shaft portion of the housing includes an annular prism, resonator 212 can be formed from a sector of the annular prism that has a different thickness than the rest of the housing. In other examples, such as when the shaft portion of the housing includes a prism of a polygonal annulus, resonator 212 can be formed from a face of the prism formed from with a different thickness than the rest of the housing. In some examples, acoustic resonator(s) can be integrated within a cap portion of the housing. In some such examples, a resonant diaphragm can be disposed (e.g., between an opening in a cylindrical portion of the cap), such that it vibrates in correspondence with vibrations generated by haptic module 210 or another driving module (not shown). Specifically, vibrations generated by haptic module 210 may propagate through air and cause the resonant diaphragm to vibrate. In some examples, haptic module 210 can correspond to a linear resonant actuator (LRA), which can cause a haptic mass to vibrate in a reciprocal manner between two ends, based on electrical signals provided to a magnetic haptic drive coil that surrounds the mass. In other examples, a different driving module such as a piston driver can be included within stylus 202 for generating a drive signal that causes acoustic resonator(s) 212 to vibrate and generate an acoustic signal. Similar to the drive signal generated by haptic module 210, a piston driver can cause acoustic resonator(s) 212 to generate an acoustic signal that can be detected by a specific target detector, and that can have a specific frequency, a specific amplitude, and/or specific duration. A piston driver can include a piston head that travels between first and second locations along an axis associated with a range of travel for the piston head, and can sometimes be connected to a rotating element that causes the piston head to travel (in contrast to haptic module 210, which generates vibrations due to electromagnetic forces in a coil surrounding a mass connected to a driveshaft). A piston head of the piston driver can have an associated surface area that displaces air as it travels along its range of motion.

Electronic device 220 can be communicatively coupled to stylus 202 (as shown by the communication channel illustrated with a bi-directional arrow between stylus 202 and device 220). Host processor 220 together with an operating system can operate to execute computer code, and produce and/or use data. The computer code and data can reside within a memory 224 that can be operatively coupled to processor 210. Memory 224 can store data used by device 220. Memory 224 can be any non-transitory computer-readable storage medium. By way of example, memory 224 can include Read-Only Memory (ROM), Random-Access Memory (RAM), hard disk drive and/or the like. The computer code and data could also reside on a removable storage medium and loaded or installed onto device 220 when needed. Removable storage mediums include, for example, CD-ROM, DVD-ROM, Universal Serial Bus (USB), Secure Digital (SD), Compact Flash (CF), Memory Stick, Multi-Media Card (MMC) and/or a network component. In some examples, memory 224 can hold data corresponding to location requests that can be wirelessly conveyed to stylus 202, sometimes specifying particular frequencies, amplitudes, and/or durations of the requested acoustic signal.

Electronic device 220 can also include wireless communication circuitry 226. The wireless communication circuitry 226 can implement a wireless communication standard such as a WiFi®, BLUETOOTH™ or the like. The wireless communication circuitry 226 can be coupled to host processor 222 (as illustrated), and thereby receive a location request corresponding to a request for stylus 202 to generate an acoustic signal.

Sensors 228 of electronic device 220 can include at least one acoustic transducer (sometimes referred to simply as an "audio sensor," "acoustic sensor," or "sound sensor"). Sensors 228 can be positioned at various locations within electronic device 220, such as at opposing ends of device 220, proximal to corners of device 220, or any other suitable location. An acoustic signal generated by stylus 202 in its beacon mode can be detected by sensors 228 (as illustrated by the dashed line between acoustic resonator(s) 212 and sensors 228). Sensors 228 can be coupled to sensing circuitry (not illustrated) that provides processing (e.g., amplification, filtering, level-shifting), and converts analog signals to digital signals. Based on the acoustic signal detected by sensors 228 (e.g., the sensor data from the sensors), host processor 222 (or other processing circuitry of device 220) can detect the presence of the stylus and/or can generate estimates for a relative position, direction, and/or distance of stylus 202 relative to device 220. When more than one of sensors 228 detects the acoustic signal, host processor 222 may be able to generate more accurate estimates. As an example, the estimates can be based on the frequency, phase, amplitude, and/or duration of the acoustic signal detected by at least one of the sensors 228. In some examples, the detection of the presence of the stylus and/or the estimates can be further based on the frequency, phase, amplitude, and/or duration of the acoustic signal specified in the location request conveyed to stylus 202 (e.g., the request that caused the acoustic signal to be generated).

In some examples, host processor 222 estimates a location of stylus 202 based on a comparison between the amplitude of the acoustic signal detected by at least one of the sensors 228 and the amplitude of the acoustic signal specified in the location request conveyed to stylus 202. In some such examples, host processor 222 may be configured to estimate a location of stylus 202 at a first distance away from device 220 in accordance with a comparison between the sensed amplitude of the acoustic signal (e.g., the amplitude detected by at least one of sensors 228) and the specified amplitude (e.g., the amplitude specified in the location request that caused the acoustic signal to be generated). Alternatively, or additionally, host processor 222 may be configured to estimate a location of stylus 202 at a first distance away from device 220 based on a difference between the specified amplitude in the location request and the sensed amplitude of the acoustic signal. In other words, in accordance with a determination that a difference between the sensed amplitude of the acoustic signal and the specified amplitude is equal to a first amount, host processor 222 may be configured to estimate that stylus 202 is located a first distance away from device 220 (e.g., the estimated first distance is based on the difference value between sensed and specified amplitudes). To estimate the distance of stylus 202, host processor 222 can retrieve a sound propagation model from memory 224 that models or otherwise describes the propagation losses (sometimes referred to as "sound attenuation") through a particular medium assumed to intervene between device 220 and stylus 202 (e.g., air, or a surface material when device 220 and stylus 202 are located at different regions of a contiguous surface). As an example, the sound propagation model can generally include loss values for a particular signal amplitude at various distances from stylus 202 (e.g., a loss value for a particular signal amplitude at a first distance, at a second distance, etc.). In some examples, the sound propagation model can be an equation that can be solved for a distance based on a loss value that host processor 222 determines (e.g., the difference between the specified amplitude and the sensed amplitude). In other examples, the sound propagation model can be a table of values, with rows corresponding to particular loss values (e.g., particular differences between the specified amplitude and the sensed amplitude) and columns corresponding to particular distances corresponding to the loss values in different mediums through which sound is propagated (e.g., distance estimates for the loss values across air, wood, metal, or any other medium).

As a general rule, loss values, corresponding to a difference between a specified amplitude and a sensed amplitude, increase as a function of distance. Stated alternatively, the sensed amplitude generally decreases, as a distance between stylus 202 and electronic device 220 increases. As an example, when a first loss value corresponds to a first distance, a second loss value that is greater than the first loss value may correspond to a second distance that is greater than the first distance. Based on a sound propagation model that maps loss values to estimated distances, host processor 222 can be configured to estimate distances between electronic device 220 and stylus 202 based on comparing, or determining a difference between, the amplitude of an acoustic signal specified in a request conveyed to stylus 202 and the amplitude of an acoustic signal sensed by sensors 228 (e.g., one or more acoustic sensors/transducers).

In some examples host processor 222 estimates a location of stylus 202 based on a comparison between the phase of the acoustic signal detected by at least one of the sensors 228 and the expected phase of the acoustic signal specified in the location request conveyed to stylus 202 (e.g., using time of flight or time of arrival of the acoustic signal to estimate a relative position of stylus 202 using cross correlation, trilateration, and/or related multilateration techniques).

The foregoing describes exemplary techniques by which host processor 222 can be configured to estimate a relative distance of stylus 202 from electronic device 220. In some examples, host processor 222 can also be configured to estimate a relative direction of stylus 202 from electronic device 220. Sensors 228, as mentioned above, can include one or more audio sensors, such as acoustic transducers, microphone sensors, etc. Sometimes, an electronic device 220 only has one audio sensor. In some such examples, device 220 can prompt a user (e.g., using a display element not illustrated in FIG. 2) to repeatedly change an orientation of the device. As an example, a device can be in a default orientation, and can further convey a location request to stylus 202 via wireless communication circuitry 226. In response to receiving the location request, stylus 202 may be configured to generate an acoustic signal based on the location request (e.g., the acoustic signal can have an amplitude, frequency, phase, and/or duration specified by the location request). The generated acoustic signal can be detected by device 220. Then, after detecting the acoustic signal generated by stylus 202 in response to the location request, the device can prompt the user to change the device orientation in a certain way (e.g., by rotating device 220 45 degrees, 90 degrees, 180 degrees, or moving device 220 in any other way). At each orientation, device 220 can detect the acoustic signal from stylus 202 (e.g., using a single acoustic sensor 228). Host processor 222 can store amplitude, frequency, phase, and/or duration values associated with the acoustic signal sensed at sensor 228, for each orientation of device 220. After collecting acoustic signal measurements corresponding to at least two orientations of the device 220, host processor 222 can estimate a relative direction of stylus 202 relative to electronic device 220. As an example, if host processor 222 collects and stores acoustic signal measurements for two orientations of the device 220 (e.g., a default orientation, and a 180 degree rotated orientation), host processor 222 can compare the detected amplitudes of the acoustic signal at the two orientations of the device and determine which of the orientations corresponded to the greater sensed amplitude of the acoustic signal. Based on the orientation of device 220 associated with a greater signal amplitude, host processor 222 can be configured to determine a relative direction of stylus 202 from device 220.

In other examples, electronic device 220 has multiple audio sensors 228. In some such examples, the multiple audio sensors 228 can collect and store acoustic signal measurements for a single orientation of device 220 (e.g., device 220 does not need to be moved/re-oriented when provided with multiple audio sensors 228). Based on a comparison of the acoustic signal measurements, host processor 222 can be configured to determine which of the measurements has the greatest signal amplitude. Based on a position of the particular audio sensor 228 that collected/measured the greatest signal amplitude, host processor 222 can be configured to determine a relative direction of stylus 202 from device 220 using triangulation techniques. In some such examples, the multiple audio sensors 228 can collect and store acoustic signal measurements for a single orientation of device 220 (e.g., device 220 does not need to be moved/re-oriented when provided with multiple audio sensors 228). Host processor 222 can be configured to compare the received signals at each audio sensor position with the expected generated signal calculate the relative phase received at each sensor position. Based on the calculated relative phase, host processor 222 can be configured to determine a relative direction of stylus 202 from device 220 using trilateration techniques. In some such examples, the multiple audio sensors 228 can collect and store acoustic signal measurements for a single orientation of device 220 (e.g., device 220 does not need to be moved/re-oriented when provided with multiple audio sensors 228). Host processor 222 can be configured to compare the received signals at each audio sensor position with the received signal at each other position to calculate the relative phase of each. Based on the calculated relative phase, host processor 222 can be configured to determine a relative direction of stylus 202 from device 220 using multilateration techniques.

The foregoing describes exemplary techniques for determining the relative direction of stylus 202 from device 220. In conjunction with the exemplary techniques for determining the relative distance of stylus 202 from device 220, host processor 222 can estimate a relative position of stylus 202 from device 220. Host processor 222 can estimate the relative position based on estimating the relative distance and the relative direction. Specifically, host processor 222 can combine the estimates for relative distance and relative direction of stylus 202 from device 220 to determine a relative position of stylus 202 from device 220.

In some examples, host processor 222 can estimate the relative position by only using trilateration techniques based on the relative phase of the expected/requested acoustic signal from the generated/received acoustic signal, as an alternative to examples described above in connection with determining the relative position using the relative direction and distance between stylus 202 and device 220.

In some examples, host processor 222 can estimate the relative position by only using multilateration techniques based on the relative phases (e.g., between the requested and received acoustic signals) measured/sensed from multiple audio sensors 228, as an alternative to examples described above in connection with determining the relative position using the relative direction and distance between stylus 202 and device 220.

In addition to estimating the relative direction, relative distance, and relative position of stylus 202 from device 220, device 220 can combine relative direction and/or relative distance and/or relative position with the known position and orientation of device 220 within a space to estimate the absolute position of stylus 202 in that space.

In addition to estimating the relative direction, relative distance, and relative position of stylus 202 from device 220, device 220 can additionally or alternatively detect the presence of stylus 202 in its environment. As an example, host processor 222 can determine whether device 220 is communicatively coupled to stylus 202 by sending a message from wireless communication circuitry 226 to wireless communication circuitry 208 at stylus 202. In some examples, stylus 202 can send an acknowledgement message via its wireless communication circuitry 208, to device 220, thereby confirming the presence of stylus 202 in a vicinity of device 220 (e.g., within a certain range associated with a pairing distance associated with a wireless communication link between stylus 202 and device 220). Another way host processor 222 can detect the presence of stylus 202 in an environment of device 220 is by sending a location request (e.g., a request to generate an acoustic signal) to stylus 202. In some examples, the acoustic signal can be detected by one or more sensors 228 of device 220 when the device is within a threshold distance away from stylus 202. In some such examples, if sensors 228 of device 220 are not able to detect the acoustic signal generated by stylus 202 (e.g., in response to stylus 202 receiving the location request), then host processor 222 of device 220 can determine that stylus 202 is further than the threshold distance away from device 220 (e.g., device 220 can forgo detecting the presence of the stylus 202). In other examples, if sensors 228 of device 220 are able to detect the acoustic signal generated by stylus 202, then host processor 222 can determine that stylus 202 is within a threshold distance away from device 220 (e.g., host processor 222 can detect that stylus 202 is in an immediate environment of device 220). In some examples, after determining that stylus 202 is within a threshold distance from device 220, host processor 222 can use the amplitude of the acoustic signal detected by sensors 228 in conjunction with a sound propagation model to estimate a relative distance between stylus 202 and device 220.

Figure 3:
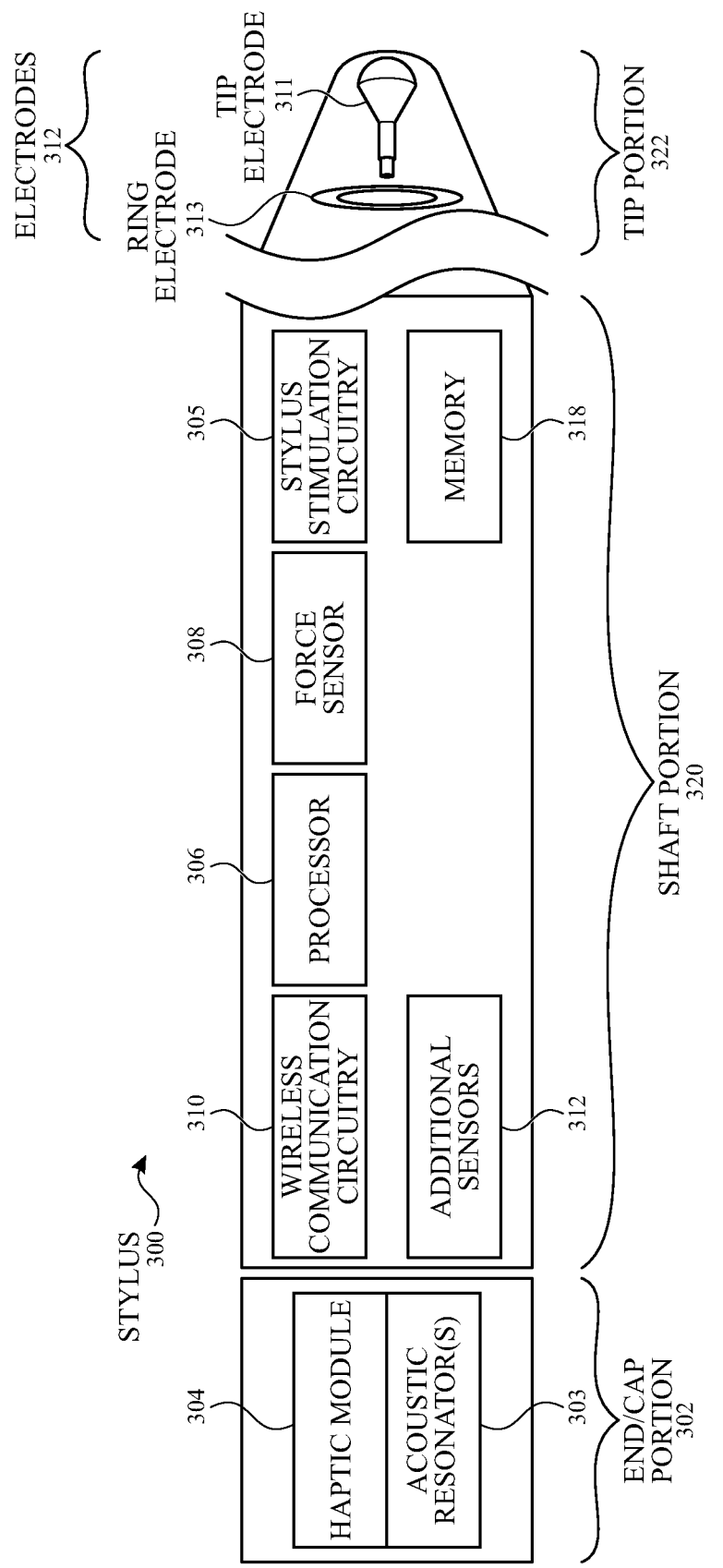
FIG. 3 illustrates an example active stylus according to examples of the disclosure.

FIG. 3 illustrates an example active stylus according to examples of the disclosure. Stylus 300 can include an end/cap portion 302, a shaft portion 320, and a tip portion 322. It should generally be understood that tip portion 322 corresponds to a first end of stylus 300, and end/cap portion 302 corresponds to a second end of stylus 300 opposite the first end. The first and second ends of stylus 300 can refer to first and second portions of the stylus that partition the stylus (e.g., ends can include proximal portions of stylus 300, not just the distal ends). Moreover, while stylus 300 is described as an "active" stylus that stimulates a touch-sensitive surface of an electronic device (e.g., devices 170 of FIG. 1), it should be understood that end/cap portion 302 can be incorporated into any type of stylus (e.g., a non-active stylus that does not stimulate a touch-sensitive surface of the electronic device), any type of peripheral input device 102, and/or any type of other peripheral device that can communicate with electronic devices 170 of FIG. 1, or with electronic device 220 of FIG. 2 (e.g., a keyboard, a mouse, a watch, a drawing pad, etc.). As such, any number of the active components described in connection with shaft portion 320 can be omitted from stylus 300 without departing from the scope of the current disclosure. Many of the features described below in connection with components of FIG. 3 relate to a default mode of stylus 300, in which the stylus can be used to provide active input to a device or to the user (e.g., optionally to a touch-sensitive surface of an electronic device). However, certain features and components described below relate to a beacon mode of stylus 300, in which the stylus generates an acoustic signal that serves as a location beacon to either a human target (e.g., a user) or an electronic detector (e.g., an electronic device with one or more audio sensors).

Stylus 300 can include one or more electrodes 312, which can be located, for example, at a first (distal) end of the stylus (e.g., the tip of the stylus). As illustrated in FIG. 3, stylus 300 can include a tip electrode 311 and a ring electrode 313, but fewer or more electrodes may be used. Tip electrode 311 can include a material capable of transmitting the stylus stimulation signal from stylus stimulation circuitry 305 to the touch-sensitive device, such as a flexible conductor, a metal, a conductor wrapped by a non-conductor, a non-conductor coated with a metal, a transparent conducting material (e.g., indium tin oxide (ITO)) or a transparent non-conductive material (e.g., glass) coated with a transparent (e.g., ITO) (if the tip is also used for projection purposes) or opaque material, or the like. In some examples, the stylus tip can have a diameter of 2 mm or less. In some examples, the stylus tip can have a diameter between 1 mm and 2 mm. Ring electrode 313 can include a conductive material, such as a flexible conductor, a metal, a conductor wrapped by a non-conductor, a non-conductor coated with a metal, a transparent conducting material (e.g., ITO) or a transparent non-conductive material (e.g., glass) coated with a transparent or opaque material, or the like.

Stylus 300 can also include stylus stimulation circuitry 305. Stylus stimulation circuitry 305 can be configured to generate one or more stylus stimulation signals at the one or more electrodes 312 to stimulate a touch sensor panel of a touch-sensitive device. For example, stylus stimulation signals can be coupled from stylus 300 to touch sensing circuitry of an electronic device, and can be used to determine a location of active stylus 300 at the surface of a touch screen.

The operation of stylus stimulation circuitry 305 can be controlled by a processor 306 (e.g., corresponding to processor 204). For example, the processor can be configured to communicate with the stylus stimulation circuitry to control the generation of stimulation signals. In some examples, the communication between the processor and stylus stimulation circuitry can be accomplished via an SPI bus, and the stylus stimulation circuitry can operate as an SPI slave device. In some examples, the stylus 300 can include more than one processor, and stylus stimulation circuitry 305 can include one or more processors. In some examples, one or more of the stylus functions described herein can be performed by firmware stored in memory or in program storage (not shown) and executed by processor 306 or a processor in stylus stimulation circuitry 305.

In some examples, stylus 300 can also include a force sensor 308 to detect the amount of force at the tip of the stylus 300. For example, when the stylus tip is touching touch screen 220, the force sensor 308 can measure the force at the stylus tip. The force information can be stored in the stylus (e.g., in memory 318) and/or transmitted (via a wired connection or wirelessly) to the electronic device 220. For example, the force information can be communicated to host processor 222 or a touch controller in electronic device 220. Force information and corresponding location information can be processed together by host processor 222 and/or the touch controller in electronic device 220.

Processor 306 can be substantially similar to processor 204 described above in connection with FIG. 2. Similar to processor 204, processor 306 can be configured to process location requests received by wireless communication circuitry 310, and can be further configured to direct haptic module 304 to provide an appropriate drive signal to acoustic resonator(s) 303, such that resonator(s) 303 generate an acoustic signal. As an example, processor 306 can process a location request received by wireless communication circuitry 310. In some examples, processor 306 can determine a desired/specified frequency, amplitude, and/or duration of acoustic signal from the location request. Based on the processed location request, processor 306 can generate an instruction for haptic module 304 that causes module 304 to generate a drive signal for acoustic resonator(s) 303. As an example, the instruction for haptic module 304 can be provided to a haptic module controller (not illustrated) that interprets the instruction and determines an appropriate signal or waveform to provide the haptic module. In some examples, the functionality of a haptic module controller is performed by processor 306. In response to receiving an instruction based on the processed location request, haptic module 304 can generate a drive signal that causes acoustic resonator(s) 303 to vibrate at the particular amplitude and frequency specified in the location request, for a particular duration specified in the location request (e.g., causes acoustic resonator(s) 303 to generate an acoustic signal). Prior to performing the steps described above in connection with causing acoustic resonator(s) 303 to generate an acoustic signal, processor 306 may switch stylus 300 from a default mode to a beacon mode.

In some examples, force sensor 308 can be coupled to processor 306. Processor 306 can process force information from force sensor 308 and, based on the force information, control stylus stimulation circuitry 305 to generate or not generate stylus stimulation signals. For example, the processor can cause stylus stimulation circuitry 305 to generate no stylus stimulation signals when no force is detected or when the force is below a threshold level. When a force (or a force at or above the threshold level) is detected (e.g., corresponding to touch-down of the stylus), the processor can cause stylus stimulation circuitry 305 to generate stylus stimulation signals and continue generating stylus stimulation signals until the detected force drops below the threshold level (or some other threshold level).

Stylus 300 can also include wireless communication circuitry 310, although in some examples the wireless communication functionality can be incorporated into other components within the stylus 300, and in other examples the stylus can communicate via a wired connection. In the context of examples of the disclosure, wireless communication circuitry 310 can be substantially similar to wireless communication circuitry 208 of FIG. 2, and can serve as a component by which a communication channel between the stylus and an electronic device can be established and maintained (e.g., the communication link between stylus 202 and device 220, illustrated in FIG. 2). In some examples, the electronic device communicates requests to the stylus by providing wireless messages to circuitry 310, which can optionally be stored in memory 318, thereby recording the message/request history with the device.

Wireless communication circuitry 310 can receive a location request from electronic device 220. The location request received at wireless communication circuitry 310 can, in some examples, specify a desired amplitude, frequency, and/or duration of an acoustic signal. By generating the acoustic signal with the desired/specified amplitude, frequency, and/or duration, stylus 300 can provide information to one or more audio sensors (e.g., sensors 228) of electronic device 220, which can in turn enable the device to detect the presence of the stylus and/or estimate a relative distance, direction, and/or position of stylus 300. Wireless communication circuitry 310 can be coupled to processor 306, which can be configured to process location requests received at circuitry 310. In some examples, wireless communication circuitry 310 can also transmit an acknowledgement message to an electronic device (e.g., device 220), which indicates successful receipt of the location request indicates that the acoustic signal specified by the request has been generated.

Wireless communication circuitry 310 can also transmit the force information (or other information, such as motion and orientation information) from the stylus 300 to the wireless communication circuitry 226 of electronic device 220. The wireless communication circuitry 310 can also receive other information including, but not limited to, information about stylus stimulus frequencies, scan plan information (i.e., the sequence of scans to be performed by the touch-sensitive device) and clock synchronization information. For example, the touch-sensitive device can transmit one or more low noise frequencies to the stylus 300, and stylus stimulation circuitry 305 can generate stimulation signals at electrodes 312 based on, or at, the one or more low noise frequencies. In some examples, the stylus stimulation circuitry 305 can generate stimulation signals at two or more different frequencies (e.g., at one frequency at the ring electrode and at a second frequency at the tip electrode), though in other examples, stimulation signals are only generated by the stylus at one frequency.

In some examples, stylus 300 can operate asynchronously from electronic device 220. In an asynchronous example, the stylus can continuously generate stimulation signals, generate stimulation signals at various intervals, or generate stimulation signals when force is detected by the force sensor 308. In other examples, wireless communication can be used to synchronize the stylus 300 and electronic device 220. For example, the stylus 300 can receive clock synchronization information and scan plans from electronic device 220 such that it can generate stimulation signals when the computing system expects such stimulation signals from the stylus. For example, the clock synchronization information can provide an updated value for the stylus clock (e.g., a timer, counter, etc.) or reset the stylus clock so that the stylus clock can be substantially the same as (or otherwise track) a system clock for the touch-sensitive device. The stylus can then use the scan plan, which can define the sequence of scan events to be performed by the touch-sensitive device at specific times, and the stylus clock to determine when the touch-sensitive device expects stylus stimulation signals to be generated. When the electronic device 220 is not expecting stylus stimulation signals, the stylus can stop generating stimulation signals. Additionally, in some examples, the electronic device 220 and stylus 300 can synchronize their communication to regular time intervals such that both the electronic device 220 and stylus 300 can save power. For example, after the stylus and computing system pair via a wireless communication channel, the communication between the stylus and computing system can occur only at specified times (based on their respective synchronized clocks). Stylus 300 and/or electronic device 220 can include one or more crystals to generate stable and accurate clock signals to improve synchronization and reduce drift between the computing system and stylus clocks.

When the stylus 300 first connects or reconnects wirelessly to the electronic device 220 it can receive frequency information from the electronic device 220. A stylus spectral analysis scan can determine one or more clean frequencies for the stylus to use and generate one or more stimulation signals. The electronic device 220 and stylus 300 can communicate (including, for example, performing a handshake between the two devices) and electronic device 220 can transmit the frequency information to the stylus 300 such that the stylus knows the appropriate one or more frequencies to use to generate one or more stimulation signals.

The stylus 300 can change at least one stimulation frequency as a result of a stylus spectral analysis scan. In a synchronous system, a stylus spectral analysis scan can execute while the stylus 300 is predicted to not be generating a stimulation signal, e.g., when a stylus scan is not executing. After completing the stylus spectral analysis scan, the frequency information can be communicated wirelessly to stylus 300 and the communication can cause the stylus 300 to change the one or more stimulation frequencies. The electronic device 220 can then switch the one or more frequencies used for demodulating stylus scan events when the stylus 300 has switched frequencies.

In other examples, stylus 300 can be asynchronous such that the stylus 300 can generate one or more stimulation signals at one or more stimulation frequencies irrespective of the timing of the stylus scan event. As a result, the stylus 300 can be stimulating the touch sensor panel during the stylus spectral analysis scan. The asynchronous stylus stimulation signals can cause the computing system to detect a signal when demodulating at the frequency of stimulation, which can be interpreted as noise at that frequency and trigger a frequency switch. In order to prevent triggering an unnecessary frequency switch, the electronic device 220 can assume that stylus lift-off will eventually occur and wait until lift-off to initiate a stylus spectral analysis scan. The electronic device 220 can predict a lift-off condition using the results of other scans, e.g., stylus scans, or stylus force information to predict that the stylus is not on the panel, and then perform a stylus spectral analysis scan.

Additionally, or alternatively, stylus 300 can include additional sensors 312. The additional sensors can include one or more motion or orientation sensors. For example, the stylus can include an accelerometer and/or gyroscope to track motion and/or orientation of the stylus, which can be used to augment stylus position data when detected by a touch-sensitive surface. The motion and/or orientation information can be stored in memory 318 and/or transferred to the computing device via wireless communication circuitry 310. Additionally, or alternatively, the additional sensors 312 of stylus 300 can include a camera to record images or video that can be used to determine the position of the stylus and/or track the motion of the stylus.

Due to the relative density of components within shaft portion 320 and tip portion 322, shaft portion 320 and tip portion 322 may not be well suited to include components required for the generation of an acoustic signal as described herein. In particular, certain sensitive components can be particularly sensitive to interference from other components or environmental effects, and can require dedicated or component-specific housing structures within stylus 300. As an example, force sensor 308 that is coupled to tip portion 322 can be sensitive to environmental effects, and can therefore be provided a dedicated housing structure within shaft portion 320 and/or tip portion 322 that cannot be modified (e.g., the dedicated housing structure for force sensor 308 cannot be modified to integrate acoustic resonator(s) 303 without compromising the accuracy/reliability of force sensor 308). Similarly, at least a portion of shaft portion 320 can contain component-specific housing structures used to sense or detect user input (e.g., touch sensing, flex sensing, etc.) and can be sensitive to (or generally, precluded from) modifications. Additionally, at least a portion of shaft portion 320 can be used to house magnets and/or a wireless charging coil and can therefore be sensitive to modifications. As a result, the most suitable location within stylus 300 for modifications such as the formation of acoustic resonator(s) 303 may be end/cap portion 302. At a second end of stylus 300, end/cap portion 302 can include haptic module 304 and acoustic resonator(s) 303. Stylus 300 can also include a battery or other power sources implemented at least partially in the shaft portion and/or the end/cap portion 302 (not pictured) for delivering power to the powered components of stylus 300. In general, while end/cap portion 302 is sometimes referred to as a different "end" of the device than tip portion 322, the various portions of stylus 300 can be considered to extend from distal ends, and even include them. As an example, considering a tip portion 322 as portion that extends from one of two distal ends of stylus 300, end/cap portion 302 can be considered to extend from the opposite distal end of stylus 300. In general, stylus 300 can be partitioned into first and second portions, with the first portion corresponding to tip portion 322 and shaft portion 320 that extend from a first distal end of stylus 300 (e.g., the tip end), and with the second portion corresponding to end/cap portion 302 that extends from a second distal end of stylus 300 (e.g., the cap end) that opposes the first distal end.

Acoustic resonator(s) 303 within end/cap portion 302 can describe one or more surfaces that are at least partially surrounded by air or an air gap, and can vibrate to generate an acoustic signal. In some examples, acoustic resonator(s) 303 can be surfaces engineered/designed to resonate at a particular resonant frequency. In other examples, acoustic resonator(s) 303 can be surfaces engineered/designed to resonate within a particular range of frequencies. Additionally, or alternatively, acoustic resonator(s) 303 can be mechanically coupled to haptic module 304 (e.g., resonator(s) 303 and module 304 can be coupled via a continuous path of material between them). In some examples, acoustic resonator(s) can be separated from haptic module 304 by an air gap. In some examples, acoustic resonator(s) 303 can be formed from the same material used to form the housing of stylus 300. In some examples, acoustic resonator(s) 303 can be formed from acrylonitrile butadiene styrene (ABS) plastic or polymer, a non-ABS plastic or polymer, or any other suitable material.

Acoustic resonator(s) 303 can be configured to vibrate in response to receiving a drive signal or a harmonic forcing signal. In the context of the current disclosure, the drive signal provided to acoustic resonator(s) 303 can originate from haptic module 304 and the vibrations caused by the haptic module. Vibrations generated at haptic module 304 can be conveyed, transmitted, or otherwise transmitted through such intervening structures to vibrate the acoustic resonator(s) 303. In some examples, acoustic resonator(s) 303 vibrate at the same frequency, amplitude, and duration as the vibrations generated at haptic module 304. In other examples, acoustic resonator(s) 303 vibrate at a different frequency and amplitude than the vibrations generated at haptic module 304 (e.g., due to transmission losses of the drive signal through structures/media that intervene between module 304 and resonator(s) 303). When acoustic resonator(s) 303 are formed from rigid or semi-rigid materials, vibrations (and the corresponding acoustic signals) are created by elastic deformation of the materials.

Based on where in end/cap portion 302 acoustic resonator(s) 303 are formed, and the material used to form resonator(s) 303, a drive signal provided to the resonator(s) can cause the resonator(s) to vibrate according to one or multiple modes. In some examples, some vibration modes can correspond to highly directional acoustic signals (e.g., acoustic signals that can be easily sensed from a particular direction, but that can be harder to sense from other directions). In other examples, some vibration modes can correspond to omni-directional acoustic signals (e.g., acoustic signals that can be sensed from any direction). Some acoustic resonator(s) 303 can be formed so one of their surfaces is exposed to air, and the resonator(s) vibrations (or elastic deformations) cause sound waves to be produced in the air surrounding stylus 300. Other acoustic resonator(s) 303 can be formed underneath other structures within stylus 300 (e.g., underneath a cap of stylus 300). In some such examples, the resonator(s) can cause sound waves to be produced in the surrounding air within the other structures. As described below in greater detail, some coverings for resonator(s) 303 in the end/cap portion 302 can completely cover the resonator, and other coverings can substantially (e.g., greater than a threshold amount, such as 80%, 90%, 95%, 98%) cover resonator(s) 303 in the end/cap portion 302 without completely covering them (e.g., due to a ventilating hole in the covering that allows sound waves produced by the resonator to escape outside of the housing of stylus 300).

Haptic module 304 can also be disposed or housed within end/cap portion 302, and can be coupled to acoustic resonator(s) 303. Haptic module 304 can receive instructions for vibrating in a manner such that acoustic resonator(s) 303, which can be mechanically coupled to the haptic module 304, vibrate at a specified frequency, amplitude, and/or duration. In some examples, the instructions for vibrating the haptic module 304 can be based on the location request received at wireless communication circuitry 310 (e.g., from electronic device 220 of FIG. 2, devices 170 of FIG. 1, etc.). Structurally, haptic module 304 can include a mass that vibrates between two locations within the module. In some examples, instructions for vibrating haptic module 304 causes electromagnetic forces (e.g., Lorentz forces) to vibrate the mass between the two locations within the module. The vibrations of haptic module 304 can be transferred or transmitted to acoustic resonator(s) 303, either through one or more air gaps or through a contiguous path of material that mechanically couples module 304 to resonator(s) 303.

In some examples, haptic module 304 can vibrate in a manner such that acoustic resonator(s) 303 do not vibrate at all, or instead vibrate in a manner such that the resonator(s) 303 do not produce an acoustic signal (or produced an acoustic signal below a threshold level). In some such examples, such as during a default mode of stylus 300, haptic module 304 can be configured to vibrate at frequencies outside an audible range of frequencies associated with human hearing. Specifically, haptic module 304 can be configured to vibrate at frequencies within a range of frequencies associated with haptic feedback, such as at frequencies less than 500 Hz. In some examples, haptic module 304 can be configured to vibrate at frequencies in the range of 80 Hz-300 Hz. Haptic module 304 can be configured to receive instructions to vibrate at frequencies within the range of frequencies associated with haptic feedback in the default mode in response to a gesture performed by the user using stylus 300, a user selection on a touch-sensitive surface of an electronic device using stylus 300, or in accordance with any other determination during a default mode of operation associated with the stylus.

In a beacon mode, haptic module 304 can vibrate in a manner such that acoustic resonator(s) 303 vibrate to generate an acoustic signal. In some examples, haptic module 304 can sometimes receive instructions from a location request (e.g., a request from an electronic device for the stylus 300 to generate an acoustic signal) that specify a target detector. A target detector can indicate which range of frequencies should be used to select a frequency for vibrating haptic module 304. Generally, stylus 300 can generate an acoustic signal that can be detected by electronic devices and/or a user. However, a target detector specified in the location request can narrow the frequency range selected at which to vibrate haptic module 304 to optimize/improve detection by the target detector. In some examples, the target detector specified in the location request is a user. In some such examples, haptic module 304 can be configured to vibrate at frequencies within an audible range of frequencies associated with human hearing. Alternatively, haptic module 304 can be configured to vibrate at frequencies within a sub-range of the audible range of frequencies associated with human hearing. In some examples, the target detector specified in the location request is an electronic device. In some such examples, haptic module 304 can be configured to vibrate at frequencies within a range of frequencies that an acoustic transducer (e.g., sensors 228 shown in FIG. 2) within the device can accurately/optimally detect. In some such examples, haptic module 304 can additionally or alternatively be configured to vibrate at frequencies within a range that the acoustic transducer can detect using less power (e.g., ranges within the frequency spectrum which require less amplification of the acoustic transducer/sensor output to produce a reliably detectable signal). In some such examples, haptic module 304 can additionally or alternatively be configured to vibrate at frequencies within a range that the acoustic transducer can detect with less noise (e.g., ranges within the frequency spectrum the acoustic transducer/sensor can detect with a high signal-to-noise ratio, or with a higher time interval between false-positive signal detections due to environmental noise). Sometimes, the range of frequencies that an acoustic transducer can accurately detect can be different from, or even partially outside the audible range of frequencies, or any sub-range of the audible range. Therefore, the range of frequencies that an acoustic transducer can accurately detect can sometimes be considered to be an inaudible range of frequencies. Generally then, the range of frequencies that an acoustic transducer can accurately detect may not be entirely inaudible for human hearing (e.g., the range associated with the transducer can at least partially overlap the audible range) or may not be entirely within the audible range of frequencies associated with human hearing (e.g., the range associated with the transducer is not a proper subset or sub-range of the audible range).

It is to be understood that the stylus 300 is not limited to the components and configuration of FIG. 3, but can include other, fewer or additional components in multiple configurations according to various examples. Additionally, the components of stylus 300 can be included within a single device or can be distributed between multiple device portions. For example, stylus 300 can include an end/cap portion 302, shaft portion 320 and a tip portion 322. In some examples, stylus 300 can include a removable stylus tip portion 322, so that the tip portion can be removed and replaced when necessary or to enable different functionality. The removable tip portion 322 and shaft portion 320 can be coupled together with a connector (not shown). For example, the connector can be a threaded screw-type connector, plug-in connector, or the like. In some examples, a locking or fastening system between the removable stylus tip portion 322 and shaft portion 320 can include a fastening bar, spring fastener and a release button. The removable tip portion 322 can include one or more electrodes 312 (e.g., for stimulating a capacitive sensor panel). Many of the remaining components can be included, as illustrated, in the shaft portion 320. It should be understood that the various components can be distributed in different ways between the shaft portion and tip portion. Additionally, it should be understood that components of a stylus (or other peripheral/input device) may be implemented in an otherwise passive stylus such that components used for touch detection proximate to a touch-sensitive surface can be omitted (e.g., stylus stimulation circuitry 305).

As alluded to above, a majority of components associated with stylus 300 can be disposed or otherwise located within shaft portion 320 and tip portion 322. As such, including haptic module 210 and/or acoustic resonator(s) 212 within these portions of stylus 300 may result in interference with densely distributed circuitry and components. Therefore, haptic module 304 (similar to module 210) and acoustic resonator(s) 303 (similar to resonator(s) 212) can be included or disposed within an end/cap portion 302 of stylus 300 that is separate from shaft portion 320, thereby reducing the risk of resonator(s) 303 and/or module 304 interfering with any of the components therein.

Figure 4:
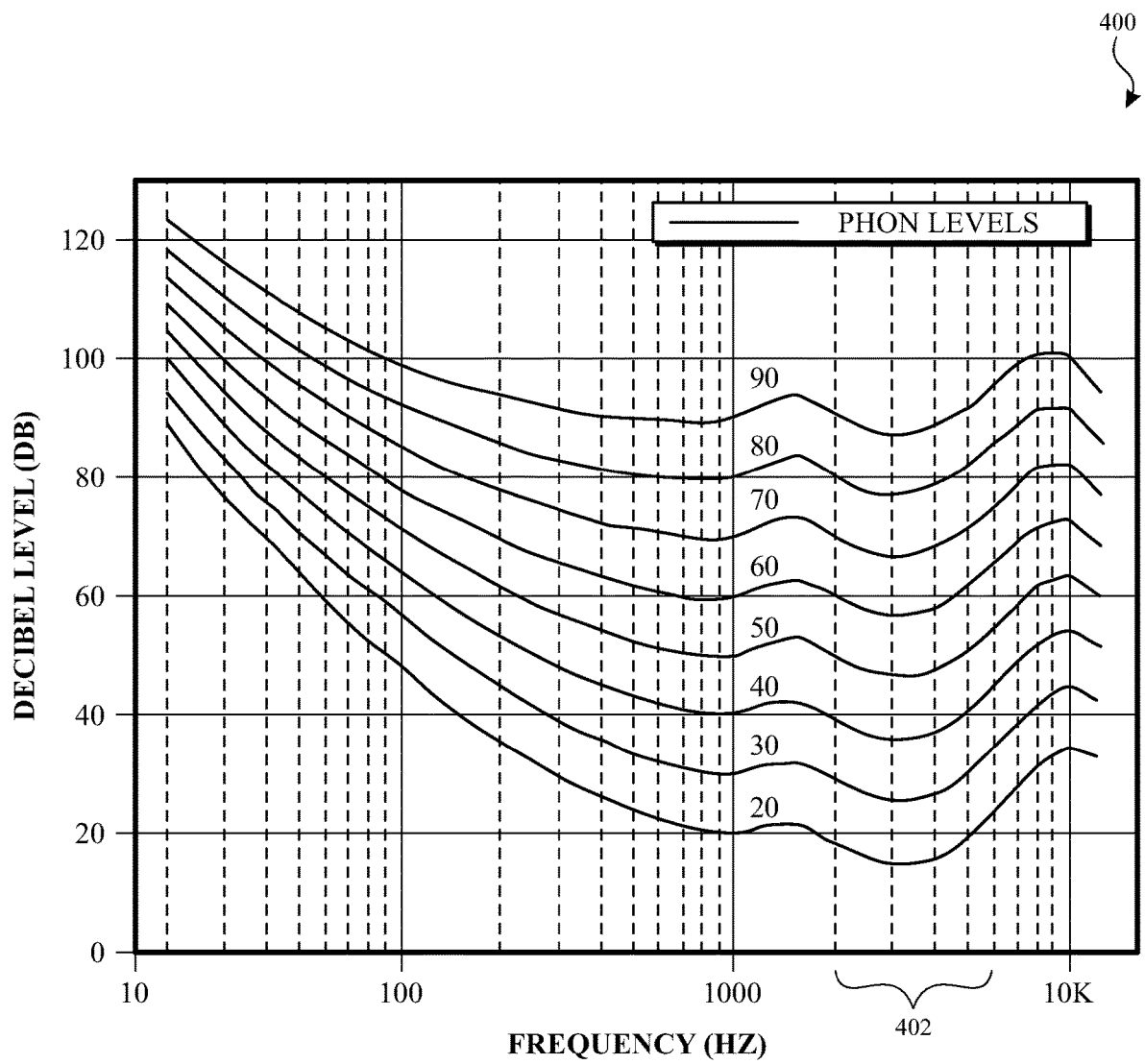
FIG. 4 illustrates example equal-loudness contours plotted on axes for decibel levels and sound frequency according to examples of the disclosure.

FIG. 4 illustrates example equal-loudness contours plotted on axes for decibel levels and sound frequency according to examples of the disclosure. A horizontal axis of FIG. 4 represents sound frequency values plotted on a logarithmic scale, and a vertical axis represents decibel levels associated with an acoustic signal. The horizontal axis includes frequencies outside the audible range of frequencies associated with human hearing, such as frequencies below 20 Hz. In general, the audible range of frequencies associated with human hearing can span from 20 Hz to 20 kHz, but in some examples, the audible range can be described as spanning from 1 kHz to 20 kHz. Notably, shrinking the audible range in such a manner can correspond to narrowing the range of frequencies to select frequencies at which a human can repeatably perceive the loudness of an acoustic signal at the selected frequencies at a particular decibel level. Human sensitivity to sound is variable across different frequencies. As shown in FIG. 4, two different frequencies can present an identical sound pressure to a human ear, yet may be psychoacoustically perceived by a user as differing in loudness (e.g., may have different phon levels).

Equal-loudness contours (labeled with phon values) correspond to logarithmic units of loudness levels. As indicated shown for frequencies below 1 kHz, loudness perceived by a user (in phons) corresponds to higher decibel levels. For example, for a 100 Hz frequency to be perceived with 40 phons of loudness, the frequency must have a sound pressure level corresponding to over 60 decibels (dBs). Similarly, for a 100 Hz frequency to be perceived with 20 phons of loudness, the frequency must have a sound pressure level corresponding to nearly 50 dBs. Because of the inefficiency of human hearing at frequencies lower than 1 kHz illustrated in FIG. 4, those lower frequencies may be avoided when providing a drive signal to acoustic resonator(s) of a stylus in a beacon mode (e.g., when generating an acoustic signal using the resonator(s)).

As also shown in FIG. 4, frequencies at 1 kHz at a given decibel level correspond to the same loudness level in phons. For example, for a 1 kHz frequency to be perceived with 40 phons of loudness, the frequency must have a sound pressure level corresponding to around 40 dBs. Similarly, for a 1 kHz frequency to be perceived with 20 phons of loudness, the frequency must have a sound pressure level corresponding to around 20 dBs. Between 1 kHz and 2 kHz, the equal-loudness contours rise slightly, indicating extra sound pressure (dBs) required to maintain the same loudness level (phons). Notably, in sub-range 402 between 2 kHz and 5 kHz, the equal-loudness contours drop slightly, indicating less sound pressure required to maintain the same loudness level. As a result, these frequencies may be more desirable to specify in a location request provided to a stylus so that the acoustic signal generated by the stylus can maximize its loudness (e.g., when a user is specified as the target detector for the acoustic signal or when using an electronic device as the target detector in the audible signal range).

In general, these sub-ranges of the audible range of frequencies illustrated in FIG. 4 can be adjusted to include any range of frequencies that are suitable for detection by a user. In some examples, processing circuitry in an electronic device (e.g., host processor 222 of FIG. 2) can specify a frequency between 1 kHz-5 kHz, 2 kHz-5 kHz, 2 kHz-6 kHz, or 1 kHz-6 kHz, according to examples of the disclosure. Selecting a frequency within any of these sub-ranges of the audible range of frequencies associated with human hearing allows the stylus to optimize its utilization of power to produce the loudest acoustic signal (measured in phons) using the lowest power level (measured in dBs). As an example, in some applications where a user is the target detector, an acoustic signal must have a loudness of 60 phon at a distance of 25 cm. Choosing a frequency within sub-range 402 can minimize the power consumption required at the peripheral device (e.g., the stylus) to generate a compliant acoustic signal.

Acoustic responses of an acoustic resonator in response to receiving a drive signal from a haptic module (e.g., haptic module 304) can be verified through empirical or experimental measurements. One empirical or experimental measurement technique to measure or classify acoustic responses of the acoustic resonator is by controlling haptic module 304 to perform a frequency sweep across a range of frequencies and measure the acoustic frequency response at each frequency in the range. Preferably, an exemplary haptic range of frequencies associated with operating haptic module 304 in a haptic mode of the stylus can be separated from an exemplary audible range of frequencies associated with operating haptic module 304 in a beacon mode of the stylus (e.g., the haptic range and audible range are non-overlapping).

As an example of the frequency sweep described above, acoustic responses of the stylus (e.g., acoustic responses of acoustic resonator 303) can be measured between a frequency range between 100 Hz and 10 kHz (e.g., between $10^2$ Hz and $10^4$ Hz) at constant power levels (e.g., keeping a magnitude of the drive signal from haptic module 304 constant across the frequency range). Within the frequency sweep range of 100 Hz-10 kHz, an example haptic frequency range can include frequencies between 100 Hz and 300 Hz, and can be associated with a particular acoustic frequency response. Although acoustic frequency response is not particularly desired for operations of haptic module 304 in the haptic mode (e.g., operations within the haptic frequency range), a frequency associated with a local maximum acoustic frequency response can be associated with an improved haptic response (e.g., more perceptible haptic feedback) for users of the stylus. For example, within the 100 Hz-300 Hz range associated with an example haptic frequency range for operating haptic module 304, a local peak frequency response can be observed at 136.7 Hz, or approximately 140 Hz. In some examples, haptic module 304 can be operated to vibrate at 140 Hz when the stylus is operated in the haptic mode, to achieve the most favorable/perceptible haptic feedback for a user. In some examples (such as for other frequency ranges), haptic module 304 can be operated to vibrate at a different frequency corresponding to a different local peak frequency response.

Within the frequency sweep range of 100 Hz-10 kHz, an example audible frequency range can include frequencies between 5.5 kHz and 7 kHz, and can be associated with a local maximum acoustic frequency response within an audible range of frequencies (e.g., similar to sub-range 402 illustrated in FIG. 4). In other words, for a constant magnitude drive signal from haptic module 304, acoustic resonator 303 can generate a peak acoustic frequency response between 5.5 kHz and 7 kHz. Within the 5.5 kHz-7 kHz range associated with a local maximum acoustic frequency response of acoustic resonator 303, a local peak frequency response can be observed at 6.2 kHz. In some examples, haptic module 304 can be operated to vibrate at 6.2 kHz when the stylus is operated in the beacon mode, to achieve the most loud/perceptible acoustic signal for a target detector (e.g., a user, or other electronic device).

Notably, the example haptic frequency ranges for the haptic mode and the example audible frequency range can be separated by a frequency range spanning hundreds or thousands of Hz. As an example based on the example frequency range of 80-300 Hz, the upper frequency of the haptic frequency range (300 Hz) can be 5.2 kHz below the lower frequency of the audible frequency range (5.5 kHz). As another example based on a frequency range that extends to 700 Hz, the upper frequency of the haptic frequency range (700 Hz) can be 5.1 kHz below the lower frequency of the audible frequency range (5.5 kHz). In some examples, the distance between the upper frequency of the haptic frequency range and the lower frequency of the audible frequency range can be separated by another amount (e.g., 1 kHz, 2, kHz, etc.) that suitably separates the ranges for different operating modes of the stylus.

Although not pictured in FIG. 4, acoustic transducers (e.g., sensors 228 of FIG. 2) in an electronic device can have their own respective sub-ranges associated with improved detection efficiency. Specifically, certain ranges of frequencies can be detected by acoustic transducers with greater accuracy, reliability, and/or consistency than other ranges. When a location request specifies an electronic device as the target detector, a peripheral device (e.g., stylus) can select a frequency within a range of frequencies associated with an optimal detection range of frequencies for the acoustic transducer in the peripheral device. Sometimes when the target detector is an electronic device, the peripheral device can select a low-noise detection frequency associated with a high signal-to-noise ratio, thereby improving the reliability of the detection of an acoustic signal generated at the selected frequency at the target electronic device. In some instances, selecting a frequency associated with a high signal-to-noise ratio can also reduce the amount of time between false detections or false alarms at the target electronic device (e.g., selecting a frequency with a minimum signal-to-noise ratio required to reject false alarms from environmental noise for greater than a certain time interval). In some instances, the peripheral device can select a low-power detection frequency associated with reduced power consumption requirements at the electronic device (e.g., ranges within the frequency spectrum the acoustic transducer/sensor can detect that require minimal amplification to produce a reliably detectable signal). As an example, the range of frequencies suitable for detection by a target electronic device can be 5 kHz-10 kHz, 5 kHz-15 kHz, 10 kHz-25 kHz, 15 kHz-25 kHz, 20 kHz-35 kHz, 25 kHz-35 kHz, or any other suitable frequency range associated with detectable ranges of a target electronic device, spanning any size frequency band (e.g., a 3 kHz, wide range of frequencies, 5 kHz wide range of frequencies, 7 kHz wide range of frequencies, etc.). Because some of these ranges include frequencies that are above a maximum frequency associated with the audible range of frequencies (e.g., above 20 kHz), the ranges of frequencies used to generate an acoustic signal when the target detector is an electronic device can be limited to frequencies within the audible range of frequencies (e.g., in instances where the acoustic resonator generating the acoustic signal is not capable of generating acoustic signals with frequencies higher than 20 kHz).

Figure 5A:
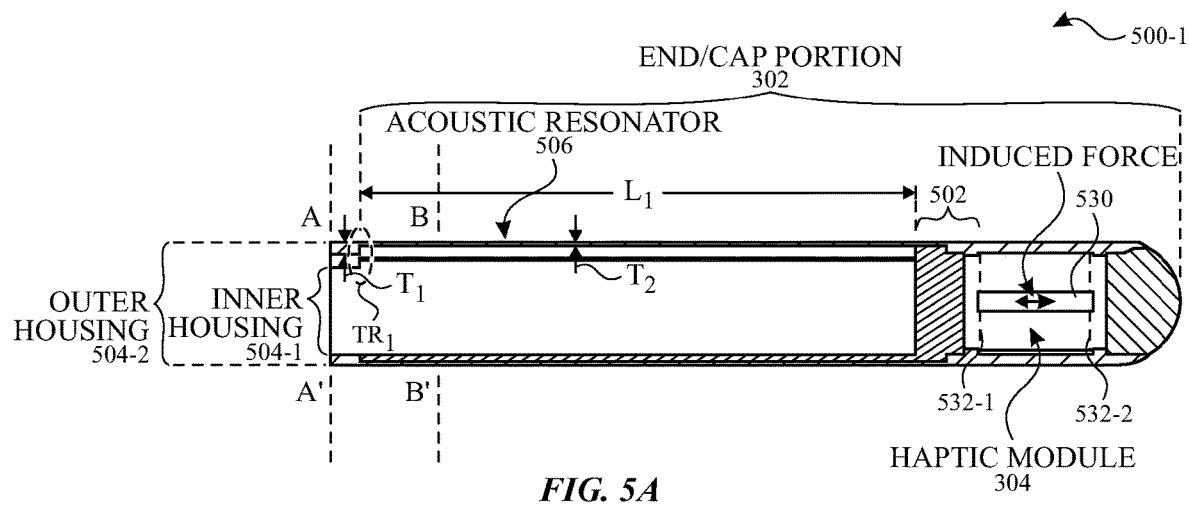
FIG. 5A illustrates a simplified cross-sectional side views of an exemplary stylus with an acoustic resonator integrated into its outer housing according to examples of the disclosure.

FIG. 5A illustrates a simplified cross-sectional side views of an exemplary stylus with an acoustic resonator integrated into its outer housing according to examples of the disclosure. Specifically, section 500-1 illustrates a cross-sectional side view along the length of end/cap portion 302 illustrated in block diagram form in FIG. 3. Section 500-1 notably shows details of a housing for the stylus 300, such as an inner housing 504-1 and an outer housing 504-2. Although only shown in connection with end/cap portion 302 in FIG. 5A, inner housing 504-1 and outer housing 504-2 can be provided for other portions of stylus 300 (e.g., shaft portion 320). Outer housing 504-2 can refer to the overall structure held by a user when operating stylus 300. Sometimes, inner-housing 504-1 can simply refer to negative space within outer housing 504-2. In some examples however, inner housing 504-1 can be a structure defined by its own sidewalls, that is integrated into the negative space within outer housing 504-2 (e.g., a shell structure that lines the inner sidewalls of outer housing 504-2). Inner housing 504-1 can define a cavity within which components of the stylus (e.g., sensitive components within shaft portion 320, a battery within end/cap portion 302, etc.) can be disposed or positioned.

In general, shaft portion 320 can be associated with a region within stylus 300 where sensitive components (e.g., the components illustrated in connection with shaft portion 320 of FIG. 3) can be disposed. In some examples, this region (e.g., shaft portion 320) where sensitive components are disposed may not be available for modifications to the inner or outer housings, at least because any modifications could interfere with the accuracy/reliability of the sensitive components. In some examples, this region (e.g., shaft portion 320) contains component-specific housing structures that cannot be modified without interfering with the proper functionality of stylus 300. In general, end/cap portion 302 can be associated with a region within stylus 300 with few or no sensitive components, and where modifications to either the inner or outer housings can be more freely made (e.g., the outer housing can be thinned in end/cap portion 302 relative to shaft portion 320, where housing modifications can be more difficult).

As described above in connection with FIG. 3, incorporating acoustic resonator(s) 303 and haptic module 304 into end/cap portion 302 may minimize or eliminate the impact of acoustic resonator(s) 303 and haptic module 304 on sensitive components disposed at various regions within shaft portion 320. FIG. 5A specifically highlights end/cap portion 302, and a transition region TR1 between shaft portion 320 and end/cap portion 302 (e.g., a transition region between a region of stylus 300 where housing structures can be more difficult to modify, and a region of stylus 300 where housing structures can be more easily modified). Haptic module 304 can be disposed at a cap region of portion 302, illustrated on the right side of FIG. 5A. Haptic module 304 can include a haptic drive shaft 530 that can have a range of motion between ends 532-1 and 532-2. To generate haptic feedback, or an acoustic signal, a drive signal from haptic module 304 can be generated by vibrations of haptic drive shaft 530 in a direction of the induced force between ends 532-1 and 532-2. In general, haptic module 304 can be disposed at an end of stylus 300 opposite tip portion 322. In other words, tip portion 322 and haptic module 304 can be disposed at opposing ends of stylus 300.

Acoustic resonator 506 can have a length $L_1$ that spans at least a portion of end/cap portion 302. In some examples, acoustic resonator 506 can be considered to have a length greater than $L_1$ such as, for example, when housing structures 502, that mechanically couple haptic module 304, are considered to be a part of acoustic resonator 506. In some such examples, length $L_1$ can be considered to correspond to a length of a resonant element of acoustic resonator 506, whereas housing structures 502 can refer to a length or portion of housing structures that transmit a drive signal from haptic module 304 to the resonant element. In general, housing structures 502 can be considered analogous to a transmission mechanism for transferring vibrational motion of a haptic mass of haptic module 304 (e.g., the drive signal produced by haptic module 304), to acoustic resonator 506. As shown at the left side of end/cap portion 302 and acoustic resonator 506, a portion of outer housing 504-2 in shaft portion 320 can have a thickness $T_1$. At a transition region TR1 between shaft portion 320 and end/cap portion 302, the outer housing 504-2 can have a thickness $T_2$ that is smaller than $T_1$, along length $L_1$ of acoustic resonator 506. Thickness $T_2$ and/or length $L_1$ can be selected to provide acoustic resonator 506 with a resonant frequency within a range of frequencies used to generate an acoustic signal. As an example, $T_2$ and/or $L_1$ can be selected to provide acoustic resonator 506 with a resonant frequency within an audible range of frequencies associated with human hearing, a sub-range of the audible range (e.g., sub-range 402 of FIG. 4), or a range of frequencies associated with optimal sensitivity of an acoustic/audio transducer within an electronic device (e.g., a range associated with high accuracy, low noise, or lower power detection by the transducer/sensor).

Although a single acoustic resonator 506 spanning the length $L_1$ is illustrated to simplify the illustration, it should be understood that any number of acoustic resonators 506 spanning length $L_1$ (or different lengths) can be integrated within end/cap portion 302. As an example, acoustic resonator 506 is illustrated as extending across a portion/sector of the outer perimeter of end/cap portion 302 (such as the outermost perimeter illustrated in the cross-section at the B-B' line of FIG. 5B). Additional acoustic resonators can extend across other portions of the perimeter, while spanning the same length $L_1$ (or different lengths). As an example, an additional acoustic resonator can be formed at the bottom portion of outer housing 504-2 that is illustrated as having the same thickness $T_1$ as the shaft portion 320 in FIG. 5A. In such an example, the additional acoustic resonator would be formed across a portion of the perimeter of end/cap portion 302 that is opposite the portion of the perimeter used to form acoustic resonator 506. Additional acoustic resonators can span a length less than $L_1$, equal to $L_1$, or a length greater than $L_1$. Notably, acoustic resonator 506 can be attached at both of its distal ends (e.g., a first end illustrated on the left is attached to outer housing 504-2, and a second end illustrated on the right is attached to housing structures 502). In response to receiving vibrational energy from haptic module 304 transmitted through housing structures 502, acoustic resonator 506 can, while remaining fixed at both of its distal ends, undergo elastic deformation and vibrate to generate an acoustic signal. In addition to deforming outward (e.g., away from inner housing 504-1) in response to receiving a drive signal from haptic module 304, acoustic resonator 506 can deform inward (e.g., toward inner housing 504-1) and periodically impinge on air gap 522 during the generation of an acoustic signal.

When stylus 300 is operated in a beacon mode, haptic module 304 can receive instructions from processor 306 (not illustrated in FIG. 5A) optionally specifying at least one of a target detector, an amplitude, a frequency, and a duration associated with an acoustic signal (e.g., based on a location request received from an electronic device). In response to receiving the instructions, haptic module 304 can vibrate a mass (not pictured) coupled to a haptic drive shaft 530 (pictured) in a direction corresponding to the bi-directional arrow labeled "induced force," between two ends 532-1 and 532-2 of the haptic module (illustrated by dashed lines). These vibrations can correspond to a drive signal, which can be mechanically transferred to acoustic resonator 506 though housing structures 502 that mechanically couple haptic module 304 to acoustic resonator 506 (e.g., an unbroken path of material between module 304 and resonator 506). In response to receiving the drive signal from haptic module 304, acoustic resonator 506 can vibrate for a particular duration at a particular frequency and/or particular amplitude (e.g., the frequency, amplitude, and/or duration specified in the location request) to generate an acoustic signal.

Figure 5B:
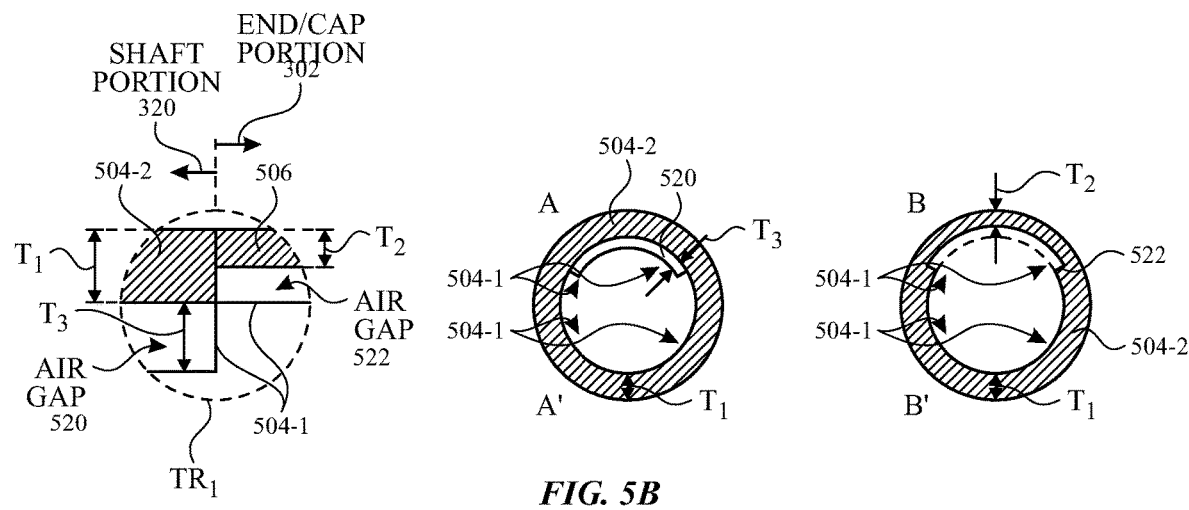
FIG. 5B illustrates an enlarged view of a transition region from FIG. 5A, and simplified cross-sectional side views along the A-A' and B-B' axes from FIG. 5A according to examples of the disclosure.

The illustrated cross-sectional side view of FIG. 5A can describe the relative position of components to one another, such as the relative positioning of haptic module 304 to acoustic resonator 506 and the intervening housing structures 502 that transmit a drive signal from haptic module 304 to acoustic resonator 506, but does not limit the exterior or interior housing geometry of any peripheral input device 102, stylus 202, or stylus 300 (as described in FIGS. 1, 2, and 3, respectively). As an example, an outer housing of the peripheral input device 102, stylus 202, or stylus 300 can have a triangular, rectangular, or other polygonal cross-sectional geometry (e.g., a cross-section of the outer housing can have any polygonal shape at end/cap portion 302). In other examples, an outer housing of the peripheral input device or stylus can have a circular or an elliptical outer housing geometry, or a combination or polygonal and circular/elliptical outer housing geometries (e.g., one or more portions of a cross-section of the outer housing are polygonal, and on or more different portions of the cross-section are circular/elliptical). Similarly, an inner housing of the peripheral device, or a cavity formed within the outer housing structure, can have any cross-sectional geometry (e.g., polygonal, circular, elliptical, a combination of polygonal and circular/elliptical, etc.). In the examples of FIG. 5B, the outer and inner housing structures are illustrated as having substantially circular cross-sectional geometries solely for the purposes of illustration, and purely in the interest of avoiding unnecessary obfuscation of the present disclosure with more complex geometries.

FIG. 5B illustrates an enlarged view of a transition region from FIG. 5A and simplified cross-sectional side views along the A-A' and B-B' axes from FIG. 5A according to examples of the disclosure. Transition region TR1 from FIG. 5A illustrates a region where shaft portion 320 connects to end/cap portion 302, and outer housing 504-2 connects to acoustic resonator 506 (to form a single contiguous structure). Within shaft portion 320 of transition region TR1, outer housing 504-2 can have a thickness $T_1$. Also, within shaft portion 320 of transition region TR1, outer housing 504-2 can be separated from inner housing 504-1 by an air gap 520 with a thickness $T_3$. In end/cap portion 302 of transition region TR1, acoustic resonator 506 can have a thickness $T_2$ that is less than $T_1$. Acoustic resonator 506 can be separated from inner housing 504-1 by an air gap 522. Because acoustic resonator 506 has a thickness $T_2$ that is reduced relative to $T_1$, and is provided air gap 522 between itself and inner housing 504-1, drive signals from haptic module 304 can cause resonator 506 to vibrate to generate an acoustic signal. In some examples, drive signals from haptic module 304 can be configured to cause acoustic resonator 506 to vibrate at a resonant frequency associated with the resonator. In other examples, drive signals from haptic module 304 can be configured to cause acoustic resonator 506 to vibrate at a frequency specified in a location request received from an electronic device.

A cross-sectional side view along the A-A' axis from FIG. 5A shows outer housing 504-2 having a circular perimeter (at least at section 500-1). However, the perimeter (and overall shape) of outer housing 504-2 can have any other shape/geometry. As an example, outer housing 504-2 can have a triangular, square, polygonal, elliptical, or other perimeter without departing from the scope of examples of the disclosure. In some examples, outer housing 504-2 can have a uniform thickness $T_1$ along its entire outer perimeter, as illustrated in FIG. 5B, however the thickness is not required to be uniform.

Air gap 520 is illustrated below a particular sector or section of the inner perimeter of outer housing 504-2. In general, air gap 520 can extend across a larger or smaller sector or section of the inner perimeter of outer housing 504-2 than shown in FIG. 5B. Alternatively, or additionally, additional air gaps (not illustrated) similar to air gap 520 can be formed at different sectors or sections of the inner perimeter of outer housing 504-2 without connecting to air gap 520. Inner housing 504-1 can be positioned within a cavity defined inside outer housing 504-2, and can be shaped such that air gap 520 is formed between inner housing 504-1 and outer housing 504-2. In some examples, where additional air gaps similar to air gap 520 are formed between outer housing 504-2 and inner housing 504-1, inner housing 504-1 can have a different shape to accommodate the formation of those additional air gaps.

A cross-sectional side view along the B-B' axis from FIG. 5A also shows outer housing 504-2 having a circular perimeter, though it should be understood that the perimeter can have any other shape/geometry, as mentioned above. Notably, this cross-sectional side view illustrates a section or sector along the outer perimeter of outer housing 504-2 that has been thinned to a thickness $T_2$ that is less than the thickness $T_1$ at the corresponding section or sector in the shaft portion 320 (e.g., illustrated by the cross-sectional view along the A-A' axis). As described above in connection with FIG. 5A, the portion of outer housing 504-2 that has been thinned to thickness $T_2$ can function as an acoustic resonator (e.g., resonator 506), by generating an acoustic signal in response to receiving a drive signal from haptic module 304. In some examples, acoustic resonator 506 extends across a smaller or larger portion/sector of the outermost perimeter of stylus 300 than the portion/sector illustrated with thickness $T_2$ in FIG. 5B. In some examples, additional acoustic resonators can be formed across other portions/sectors of the outermost perimeter of stylus 300 and can be distinct (e.g., not connected) to acoustic resonator 506.

A section of a perimeter of inner housing 504-1 underneath the section of outer housing thinned to thickness $T_2$ is represented with a dashed line to indicate that this portion of inner housing 504-1 can be omitted. In the example configuration illustrated in FIG. 5B, where both the outer and inner housings have substantially circular cross-sectional geometries (for simplicity), this optionally omittable portion of inner housing 504-1 can be a circular sector. In examples where the dashed sector of inner housing 504-1 can be omitted, air gap 522 can extend into the entire inner cavity formed by inner housing 504-1. In other examples, however, the dashed sector of inner housing 504-1 can be formed from material (as illustrated in FIG. 5A), and air gap 522 can extend between acoustic resonator 506 (e.g., a portion of outer housing 504-2 with thickness T 2) and inner housing 504-1.

Figure 5C:
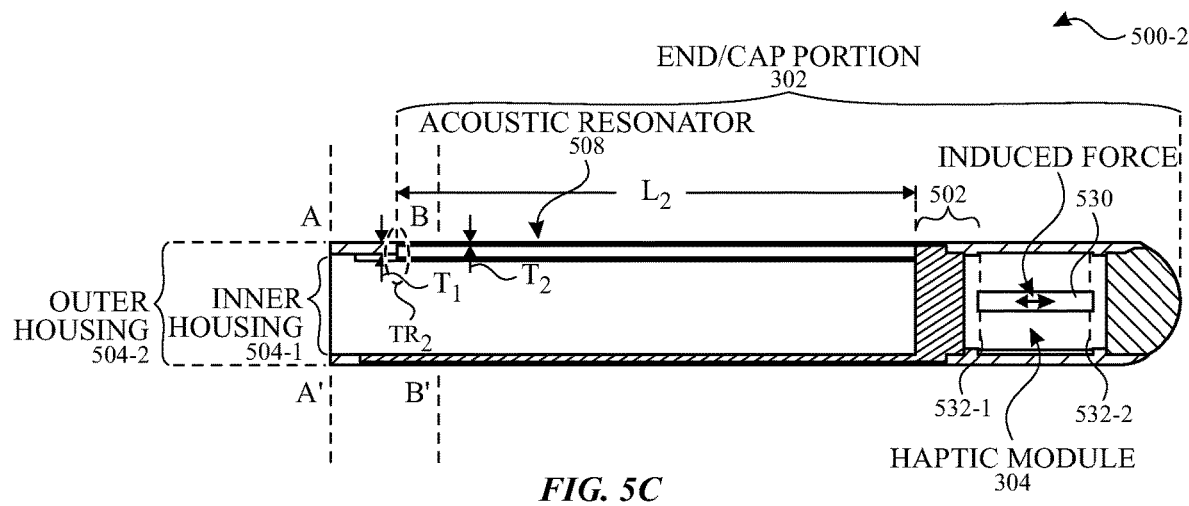
FIG. 5C illustrates a simplified cross-sectional side views of an exemplary stylus with an acoustic resonator integrated into its outer housing according to examples of the disclosure.

FIG. 5C illustrates a simplified cross-sectional side views of an exemplary stylus with an acoustic resonator integrated into its outer housing according to examples of the disclosure. Section 500-2 illustrates a cross-sectional side view along the length of end/cap portion 302 illustrated in block diagram form in FIG. 3. Section 500-2 can be similar to section 500-1, except for the transition region TR2 between shaft portion 320 and end/cap portion 302. Additionally, air gap 520 between outer housing 504-2 and inner housing 504-1 in shaft portion 320 is absent in the example illustrated by FIG. 5C.

Acoustic resonator 508 can have a length $L_2$ that spans at least a portion of end/cap portion 302. In some examples, $L_2$ can be equivalent to the length $L_1$ represented in FIG. 5A, although other lengths $L_2$ can be selected to provide acoustic resonator 508 with a desired resonant frequency. In some examples, acoustic resonator 508 can be considered to have a length greater than $L_2$ such as, for example, when housing structures 502, that mechanically couple haptic module 304, are considered to be a part of acoustic resonator 508. In some such examples, length $L_2$ can be considered to correspond to a length of a resonant element of acoustic resonator 508, whereas housing structures 502 can refer to a length or portion of housing structures that transmit a drive signal from haptic module 304 to the resonant element. Similarly, thickness $T_2$ can be selected to provide acoustic resonator 508 with a resonant frequency within a range of frequencies used to generate an acoustic signal. As an example, length $L_2$ and/or thickness $T_2$ can be selected to provide acoustic resonator 508 with a resonant frequency within an audible range of frequencies associated with human hearing, a sub-range of the audible range (e.g., sub-range 402 of FIG. 4), or a range of frequencies associated with optimal sensitivity of an acoustic/audio transducer within an electronic device (e.g., a range associated with high accuracy, lower noise, or lower power detection by the transducer/sensor).

Although a single acoustic resonator 508 spanning the length $L_2$ is illustrated to simplify the illustration, it should be understood that any number of acoustic resonators 508 spanning length $L_2$ (or, different lengths) can be integrated within end/cap portion 302. As an example, acoustic resonator 508 is illustrated as extending across a portion of the outer perimeter of end/cap portion 302 (such as the outermost perimeter illustrated in the cross-section at the B-B' line of FIG. 5D). Additional acoustic resonators can extend across other portions of the perimeter, while spanning the same length $L_2$ (or, different lengths). As an example, an additional acoustic resonator can be formed at the bottom portion of outer housing 504-2 that is illustrated with the same thickness $T_1$ as the shaft portion 320 in FIG. 5C. In such an example, the additional acoustic resonator would be formed across a portion of the perimeter of end/cap portion 302 that is opposite the portion of the perimeter used to form acoustic resonator 508. Additional acoustic resonators can span a length less than $L_2$, equal to $L_2$, or a length greater than $L_2$. Notably, acoustic resonator 506 can be attached at both of its distal ends (e.g., a first end illustrated on the left is attached to outer housing 504-2, and a second end illustrated on the right is attached to housing structures 502). In response to receiving vibrational energy from haptic module 304 transmitted through housing structures 502, acoustic resonator 506 can, while remaining fixed at both of its distal ends, undergo elastic deformation and vibrate to generate an acoustic signal. In addition to deforming outward (e.g., away from inner housing 504-1) in response to receiving a drive signal from haptic module 304, acoustic resonator 506 can deform inward (e.g., toward inner housing 504-1) and periodically impinge on air gap 522 during the generation of an acoustic signal.

When stylus 300 is operated in a beacon mode, haptic module 304 can receive instructions from processor 306 (not illustrated in FIG. 5C) optionally specifying a target detector, an amplitude, a frequency, and/or duration associated with an acoustic signal (e.g., based on a location request received from an electronic device). In response to receiving the instructions, haptic module 304 can vibrate a mass (not pictured) coupled to a haptic drive shaft 530 (pictured) in a direction corresponding to the bi-directional arrow labeled "induced force," between two ends 532-1 and 532-2 of the haptic module (illustrated by dashed lines). These vibrations can correspond to a drive signal, which is mechanically transferred to acoustic resonator 508 though housing structures 502 that mechanically couple haptic module 304 to acoustic resonator 508 (e.g., an unbroken path of material between module 304 and resonator 508). In general, housing structures 502 can be considered analogous to a transmission mechanism for transferring vibrational motion of a haptic mass of haptic module 304 (e.g., the drive signal produced by haptic module 304), to acoustic resonator 506. In response to receiving the drive signal from haptic module 304, acoustic resonator 508 can vibrate for a particular duration at a particular frequency and/or particular amplitude (e.g., the frequency, amplitude, and/or duration specified in the location request) to generate an acoustic signal.

Figure 5D:
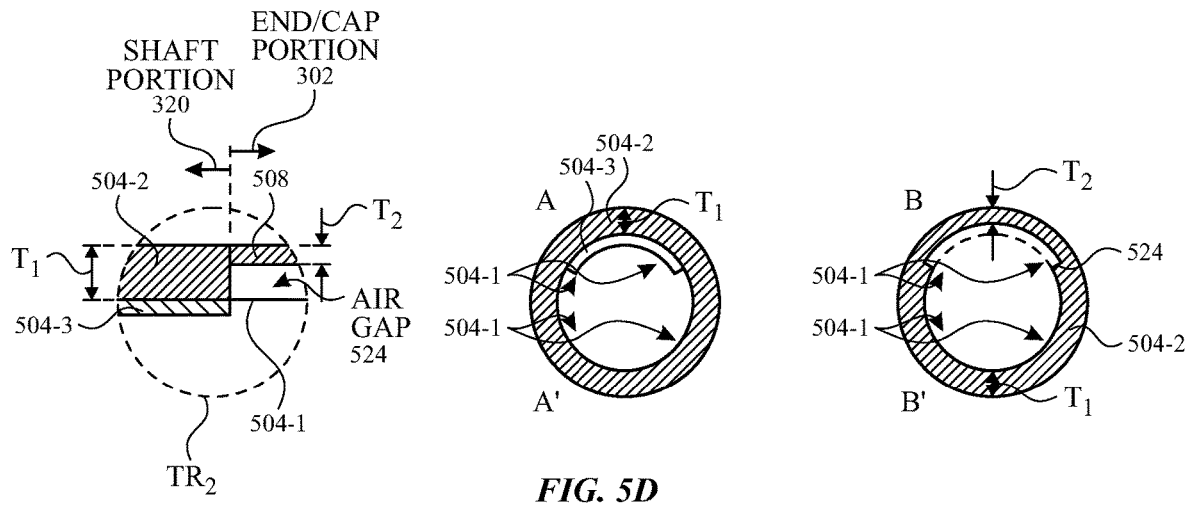
FIG. 5D illustrates an enlarged view of a transition region from FIG. 5C, and a simplified cross-sectional side view along the A-A' and B-B' axes from FIG. 5C according to examples of the disclosure.

The illustrated cross-sectional side view of FIG. 5C can describe the relative position of components to one another, such as the relative positioning of haptic module 304 to acoustic resonator 506 and the intervening housing structures 502 that transmit a drive signal from haptic module 304 to acoustic resonator 506, but does not limit the exterior or interior housing geometry of any peripheral input device 102, stylus 202, or stylus 300 (as described in FIGS. 1, 2, and 3, respectively). As an example, an outer housing of the peripheral input device 102, stylus 202, or stylus 300 can have a triangular, rectangular, or other polygonal cross-sectional geometry (e.g., a cross-section of the outer housing can have any polygonal shape at end/cap portion 302). In other examples, an outer housing of the peripheral input device or stylus can have a circular or an elliptical outer housing geometry, or a combination or polygonal and circular/elliptical outer housing geometries (e.g., one or more portions of a cross-section of the outer housing are polygonal, and on or more different portions of the cross-section are circular/elliptical). Similarly, an inner housing of the peripheral device, or a cavity formed within the outer housing structure, can have any cross-sectional geometry (e.g., polygonal, circular, elliptical, a combination of polygonal and circular/elliptical, etc.). In the examples of FIG. 5D, the outer and inner housing structures are illustrated as having substantially circular cross-sectional geometries solely for the purposes of illustration, and purely in the interest of avoiding unnecessary obfuscation of the present disclosure with more complex geometries.

FIG. 5D illustrates an enlarged view of a transition region from FIG. 5C, and simplified cross-sectional side views along the A-A' and B-B' axes from FIG. 5C according to examples of the disclosure. Transition region TR2 from FIG. 5C illustrates a region where shaft portion 320 connects to end/cap portion 302, and outer housing 504-2 connects to acoustic resonator 508 (to form a single contiguous structure). Within shaft portion 320 of transition region TR2, outer housing 504-2 can have a thickness $T_1$. Also, within shaft portion 320 of transition region TR2, housing support segment 504-3 can be directly attached to inner housing 504-1. In end/cap portion 302, acoustic resonator 508 can have a thickness $T_2$ that is less than $T_1$. Acoustic resonator 508 can be separated from inner housing 504-1 by an air gap 524. Because acoustic resonator 508 has a thickness $T_2$ that is reduced relative to $T_1$, and is provided air gap 524 between itself and inner housing 504-1, drive signals from haptic module 304 can cause resonator 508 to vibrate to generate an acoustic signal. In some examples, drive signals from haptic module 304 can be designed to cause acoustic resonator 508 to vibrate at a resonant frequency associated with the resonator. In other examples, drive signals from haptic module 304 can be configured to cause acoustic resonator 508 to vibrate at a frequency specified in a location request received from an electronic device.

A cross-sectional side view along the A-A' axis from FIG. 5C shows outer housing 504-2 having a circular perimeter (at least at section 500-2). However, the perimeter (and overall shape) of outer housing 504-2 can have any other shape/geometry. As an example, outer housing 504-2 can have a triangular, square, polygonal, elliptical, or other perimeter without departing from the scope of examples of the disclosure. In some examples, outer housing 504-2 can have a uniform thickness $T_1$ along its entire outer perimeter, as illustrated in FIG. 5D, but the thickness may not be uniform in some examples.

Housing support segment 504-3 is illustrated below a particular sector or section of the inner perimeter of outer housing 504-2. In general, housing support segment 504-3 can extend across a larger sector or smaller or section of the inner perimeter of outer housing 504-2 than shown in FIG. 5D. Alternatively, or additionally, additional housing support segments (not illustrated) similar to segment 504-3 can be formed at different sectors or sections of the inner perimeter of outer housing 504-2, without connecting to segment 504-3. Inner housing 504-1 can be positioned within a cavity defined inside outer housing 504-2, and can be shaped to accommodate housing support segment 504-3 between itself and outer housing 504-2. In some examples, where additional housing support segments similar to segment 504-3 are formed between outer housing 504-2 and inner housing 504-1, inner housing 504-1 can have a different shape to accommodate the formation of those additional housing support segments. In some examples, housing support segment 504-3 can simply be considered a part or feature of inner housing 504-1.

A cross-sectional side view along the B-B' axis from FIG. 5C can be substantially similar to the cross-sectional side view along the B-B' axis illustrated in FIG. 5B (e.g., in connection with FIG. 5A), and details are not repeated to avoid unnecessary repetition (e.g., in the interest of brevity).

A section of a perimeter of inner housing 504-1 underneath the section of outer housing thinned to thickness $T_2$ is represented with a dashed line to indicate that this portion of inner housing 504-1 can be omitted. In the example configuration illustrated in FIG. 5B, where both the outer and inner housings have substantially circular cross-sectional geometries (for simplicity), this optionally omittable portion of inner housing 504-1 can be a circular sector. In examples where the dashed sector of inner housing 504-1 can be omitted, air gap 524 can extend into the entire inner cavity formed by inner housing 504-1. In other examples, however, the dashed sector of inner housing 504-1 can be formed from material (as illustrated in FIG. 5C), and air gap 524 can extend between acoustic resonator 508 (e.g., a portion of outer housing 504-2 with thickness $T_2$) and inner housing 504-1.

Figure 5E:
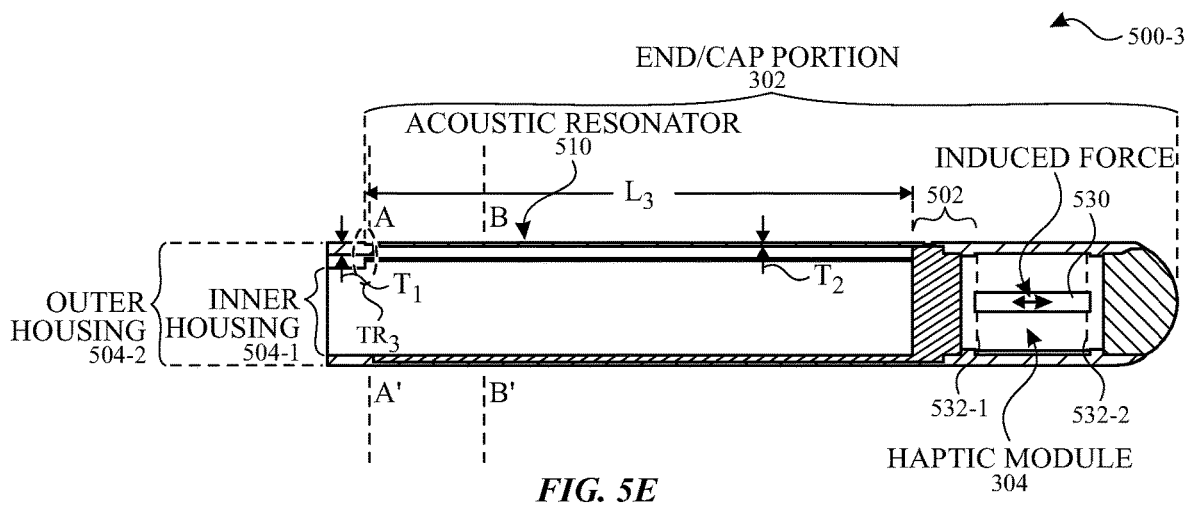
FIG. 5E illustrates a simplified cross-sectional side views of an exemplary stylus with an acoustic resonator integrated into its outer housing according to examples of the disclosure.

FIG. 5E illustrates a simplified cross-sectional side views of an exemplary stylus with an acoustic resonator integrated into its outer housing according to examples of the disclosure. Section 500-2 illustrates a cross-sectional side view along the length of end/cap portion 302 illustrated in block diagram form, in FIG. 3. Section 500-2 can be similar to section 500-1 illustrated in FIG. 5A, except for the transition region TR3 between shaft portion 320 and end/cap portion 302, and notches formed in outer housing 504-2 at certain positions within end/cap portion 302. In some examples, notches can be formed at two locations within end/cap portion 302, and are described in greater detail in connection with FIG. 5F.

Acoustic resonator 510 can have a length $L_3$ that spans at least a portion of end/cap portion 302. In some examples, $L_3$ can be equivalent to the length $L_1$ represented in FIG. 5A, although other lengths $L_3$ can be selected to provide acoustic resonator 510 with a desired resonant frequency. In some examples, acoustic resonator 510 can be considered to have a length greater than $L_3$ when housing structures 502 that mechanically couple haptic module 304 are considered to be a part of acoustic resonator 510. In some such examples, length $L_3$ can be considered to correspond to a length of a resonant element of acoustic resonator 508, whereas housing structures 502 can refer to a length or portion of housing structures that transmit a drive signal from haptic module 304 to the resonant element. Similarly, thickness $T_2$ can be selected to provide acoustic resonator 510 with a resonant frequency within a range of frequencies used to generate an acoustic signal. As an example, length $L_3$ and/or thickness $T_2$ can be selected to provide acoustic resonator 510 with a resonant frequency within an audible range of frequencies associated with human hearing, a sub-range of the audible range (e.g., sub-range 402 of FIG. 4), or a range of frequencies associated with optimal sensitivity of an acoustic/audio transducer within an electronic device (e.g., a range associated with high accuracy, low noise, or lower power detection by the transducer/sensor). In general, housing structures 502 can be considered analogous to a transmission mechanism for transferring vibrational motion of a haptic mass of haptic module 304 (e.g., the drive signal produced by haptic module 304), to acoustic resonator 506.

Although a single acoustic resonator 510 spanning the length $L_3$ is illustrated to simplify the illustration, it should be understood that any number of acoustic resonators 510 spanning length $L_3$ (or, different lengths) can be integrated within end/cap portion 302. As an example, acoustic resonator 510 is illustrated as extending across a portion of the outer perimeter of end/cap portion 302 (such as the outermost perimeter illustrated in the cross-section at the B-B' line of FIG. 5F). Additional acoustic resonators can extend across other portions of the perimeter, while spanning the same length $L_3$ (or, different lengths). As an example, an additional acoustic resonator can be formed at the bottom portion of outer housing 504-2 that is illustrated with the same thickness T 1 as the shaft portion 320 in FIG. 5E. In such an example, the additional acoustic resonator would be formed across a portion of the perimeter of end/cap portion 302 that is opposite the portion of the perimeter used to form acoustic resonator 510. Additional acoustic resonators can span a length less than $L_3$, equal to $L_3$, or a length greater than $L_3$. Notably, acoustic resonator 506 can be attached at both of its distal ends (e.g., a first end illustrated on the left is attached to outer housing 504-2, and a second end illustrated on the right is attached to housing structures 502). In response to receiving vibrational energy from haptic module 304 transmitted through housing structures 502, acoustic resonator 506 can, while remaining fixed at both of its distal ends, undergo elastic deformation and vibrate to generate an acoustic signal. In addition to deforming outward (e.g., away from inner housing 504-1) in response to receiving a drive signal from haptic module 304, acoustic resonator 506 can deform inward (e.g., toward inner housing 504-1) and periodically impinge on air gap 522 during the generation of an acoustic signal.

When stylus 300 is operated in a beacon mode, haptic module 304 can receive instructions from processor 306 (not illustrated in FIG. 5E) optionally specifying a target detector, an amplitude, a frequency, and/or duration associated with an acoustic signal (e.g., based on a location request received from an electronic device). In response to receiving the instructions, haptic module 304 can vibrate a mass (not pictured) coupled to a haptic drive shaft 530 (pictured) in a direction corresponding to the bi-directional arrow labeled "induced force," between two ends 532-1 and 532-2 of the haptic module (illustrated by dashed lines). These vibrations can correspond to a drive signal, which is mechanically transferred to acoustic resonator 510 though housing structures 502 that mechanically couple haptic module 304 to acoustic resonator 510 (e.g., an unbroken path of material between module 304 and resonator 510). In response to receiving the drive signal from haptic module 304, acoustic resonator 510 can vibrate for a particular duration at a particular frequency and/or particular amplitude (e.g., the frequency, amplitude, and/or duration specified in the location request) to generate an acoustic signal.

Figure 5F:
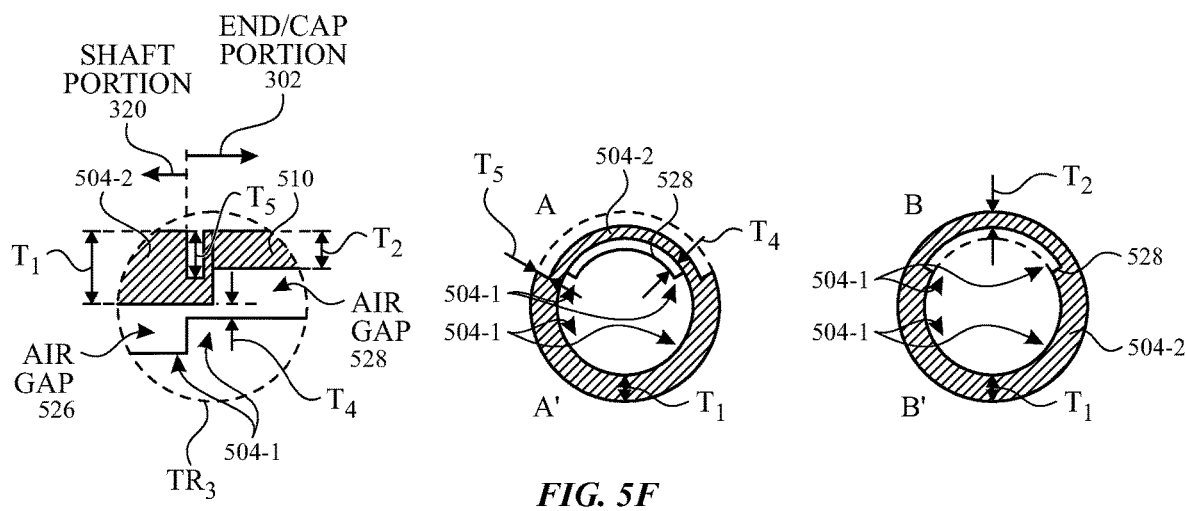
FIG. 5F illustrates an enlarged view of a transition region from FIG. 5E, and a simplified cross-sectional side view along the A-A' and B-B' axes from FIG. 5E according to examples of the disclosure.

The illustrated cross-sectional side view of FIG. 5E can describe the relative position of components to one another, such as the relative positioning of haptic module 304 to acoustic resonator 506 and the intervening housing structures 502 that transmit a drive signal from haptic module 304 to acoustic resonator 506, but does not limit the exterior or interior housing geometry of any peripheral input device 102, stylus 202, or stylus 300 (as described in FIGS. 1, 2, and 3, respectively). As an example, an outer housing of the peripheral input device 102, stylus 202, or stylus 300 can have a triangular, rectangular, or other polygonal cross-sectional geometry (e.g., a cross-section of the outer housing can have any polygonal shape at end/cap portion 302). In other examples, an outer housing of the peripheral input device or stylus can have a circular or an elliptical outer housing geometry, or a combination or polygonal and circular/elliptical outer housing geometries (e.g., one or more portions of a cross-section of the outer housing are polygonal, and on or more different portions of the cross-section are circular/elliptical). Similarly, an inner housing of the peripheral device, or a cavity formed within the outer housing structure, can have any cross-sectional geometry (e.g., polygonal, circular, elliptical, a combination of polygonal and circular/elliptical, etc.). In the examples of FIG. 5F, the outer and inner housing structures are illustrated as having substantially circular cross-sectional geometries solely for the purposes of illustration, and purely in the interest of avoiding unnecessary obfuscation of the present disclosure with more complex geometries.

FIG. 5F illustrates an enlarged view of a transition region from FIG. 5E, simplified cross-sectional side views along the A-A' and B-B' axes from FIG. 5E according to examples of the disclosure. Transition region TR3 from FIG. 5E illustrates a region where shaft portion 320 connects to end/cap portion 302, and outer housing 504-2 connects to acoustic resonator 508 (to form a single contiguous structure). Within shaft portion 320 of transition region TR3, outer housing 504-2 can have a thickness $T_1$. Also, within shaft portion 320 of transition region TR3, outer housing 504-2 can be separated from inner housing 504-1 by an air gap 526. In end/cap portion 302, acoustic resonator 510 can have a thickness $T_2$ that is less than $T_1$. Outer housing 504-2 with a thickness $T_1$ can extend into a portion of end/cap portion 302, as illustrated. This portion of outer housing 504-2 that extends into portion 302 can have a notch with a thickness $T_5$ that represents the depth of a cutout from outer housing 504-2 that defines the notch. This portion of outer housing 504-2 that extends into portion 302 can be separated from inner housing 504-1 by a thickness $T_4$ in end/cap portion 302 (and defines another air gap). Acoustic resonator 510 can be separated from inner housing 504-1 by an air gap 528. The air gap associated with the thickness $T_4$ can connect air gap 526 to air gap 526. Because acoustic resonator 510 has a thickness $T_2$ that is reduced relative to $T_1$, and is provided air gap 528 between itself and inner housing 504-1, drive signals from haptic module 304 can cause resonator 510 to vibrate to generate an acoustic signal. Additionally, air gap 528 connects to air gap 526 (e.g., by the air gap between outer housing 504-2 and inner housing 504-1 in end/cap region 302), thereby improving the acoustic performance of resonator 510. In some examples, drive signals from haptic module 304 can be designed to cause acoustic resonator 510 to vibrate at a resonant frequency associated with the resonator. In other examples, drive signals from haptic module 304 can be configured to cause acoustic resonator 510 to vibrate at a frequency specified in a location request received from an electronic device.

A cross-sectional side view along the A-A' axis from FIG. 5E shows outer housing 504-2 having a circular perimeter (at least at section 500-3). However, the perimeter (and overall shape) of outer housing 504-2 can have any other shape/geometry. As an example, outer housing 504-2 can have a triangular, square, polygonal, elliptical, or other perimeter without departing from the scope of examples of the disclosure. In some examples, outer housing 504-2 can have a uniform thickness $T_1$ along its entire outer perimeter, as illustrated in FIG. 5F, but the thickness may not be uniform in some examples (e.g., where a notch is formed). Specifically, the notch with thickness $T_5$ extends across a portion/sector of the outer perimeter of outer housing 504-2. A similar notch can be formed at another end of end/cap portion 302 (e.g., the region of portion 302 between haptic module 304 and acoustic resonator 510). The formation of a notch causes a portion of the outer perimeter of outer housing 504-2 to be removed, effectively thinning a sector/portion of the inner perimeter of outer housing 504-2 to a thickness equivalent to the difference between $T_1$ and $T_5$ (e.g., $T_1$ minus $T_5$). In some examples, the thinned sector/portion of the inner perimeter of outer housing 504-2 associated with the notch can extend across a larger or smaller sector/portion than illustrated in FIG. 5F.

Air gap 528 with a thickness $T_4$ is illustrated below a particular sector or section of the inner perimeter of outer housing 504-2. In general, air gap 528 can extend between a different/additional sector or section of the region between outer housing 504-2 and inner housing 504-1. Inner housing 504-1 can be positioned within a cavity defined inside outer housing 504-2, and can be shaped to accommodate air gap 528 with thickness $T_4$. In some examples, where additional air gaps 528 are formed between outer housing 504-2 and inner housing 504-1, inner housing 504-1 can have a different shape to accommodate the formation of those additional air gaps.

A cross-sectional side view along the B-B' axis from FIG. 5E can be substantially similar to the cross-sectional side view along the B-B' axis illustrated in FIG. 5B (e.g., in connection with FIG. 5A), and details are not repeated to avoid unnecessary repetition (e.g., in the interest of brevity).

A section of a perimeter of inner housing 504-1 underneath the section of outer housing thinned to thickness $T_2$ is represented with a dashed line to indicate that this portion of inner housing 504-1 can be omitted. In the example configuration illustrated in FIG. 5B, where both the outer and inner housings have substantially circular cross-sectional geometries (for simplicity), this optionally omittable portion of inner housing 504-1 can be a circular sector. In examples where the dashed sector of inner housing 504-1 is omitted, air gap 528 extends into the entire inner cavity formed by inner housing 504-1. In other examples, however, the dashed sector of inner housing 504-1 is formed from material (as illustrated in FIG. 5E), and air gap 528 extends between acoustic resonator 510 (e.g., a portion of outer housing 504-2 with thickness $T_2$) and inner housing 504-1.

Figure 6A:
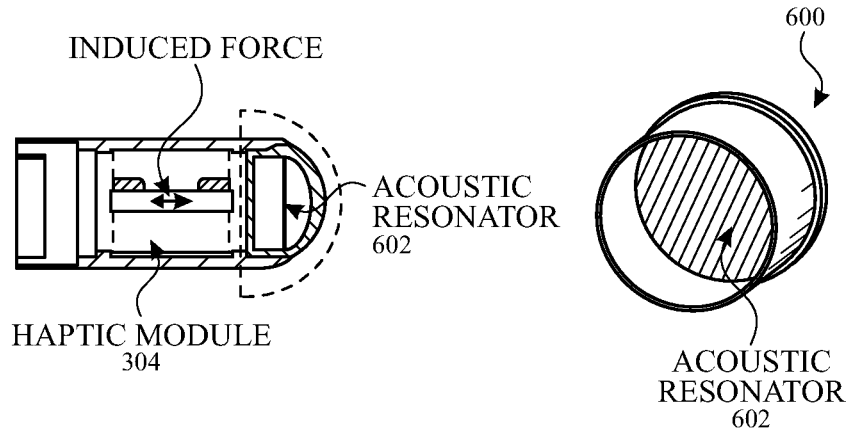
FIGS. 6A-B illustrates views of an exemplary acoustic resonator integrated into a cap portion of an active stylus according to examples of the disclosure.

FIG. 6A illustrates views of an exemplary acoustic resonator integrated into a cap portion of an active stylus according to examples of the disclosure. The left side of FIG. 6A illustrates a cross-sectional side view along the length of a cap portion of end/cap portion 302 that includes haptic module 304 and acoustic resonator 602 positioned to the right of haptic module 304. The right side of FIG. 6A illustrates a perspective view of an un-capped cylindrical structure 600 within the cap portion, showing acoustic resonator 602 more clearly. Uncapped cylindrical structure 600 can have a cross-sectional geometry with a circular outer perimeter and a circular inner perimeter (e.g., the perimeter which acoustic resonator 602 is attached to). In some examples however, un-capped cylindrical structure 600 has a different cross-sectional geometry. Specifically, a circular annulus of any cross-section of the un-capped cylindrical structure 600 can be replaced with any other suitable cross-sectional shape/geometry, and elongated such that it fills the dimensions of the structure as illustrated in the cross-sectional side view (e.g., the left side of FIG. 6A). As an example, a cross-section of structure 600 can have an elliptical or polygonal outer perimeter (or an outer perimeter that combines circular/elliptical and polygonal geometries), and an elliptical or polygonal inner perimeter (or an inner perimeter that combines circular/elliptical and polygonal geometries). In some examples, the outer perimeter of a cross-section of structure 600 can have the same geometry as an inner perimeter of a cross section of the outer housing of a stylus, or peripheral input device (e.g., structure 600 can be structurally configured to mate with a cavity in an end/cap region of the stylus or peripheral input device).

Figure 6B:
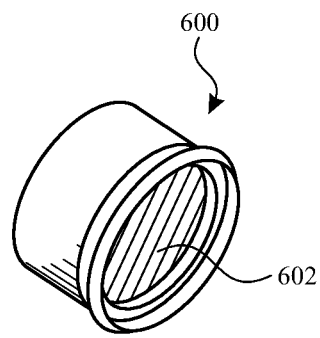

FIG. 6B illustrates another perspective view of the uncapped cylindrical structure 600 within the cap portion, including acoustic resonator 602. Similar to the acoustic resonators 506, 508, and 510 of FIGS. 5A-5F, acoustic resonator 602 can function as a diaphragm that undergoes elastic deformation to vibrate at a frequency based on a drive signal provided by haptic module 304. Specifically, haptic module 304 can vibrate a mass connected to a driveshaft between two ends (represented by dashed lines) along an axis labeled "induced force." These vibrations from haptic module 304 can serve as a drive signal, which can cause acoustic resonators 506, 508, and 510 of FIGS. 5A-5F to vibrate and generate an acoustic signal at a specified frequency and/or amplitude, for a specified duration (e.g., specified in a location request received at stylus 300 from another electronic device). The same vibrations from haptic module 304 can serve as a drive signal, that can cause acoustic resonator 602 to vibrate and generate an acoustic signal, despite acoustic resonator 602 not being mechanically coupled to haptic module 304. Generally, an air gap between haptic module 304 and resonator 602 can be considered analogous to a transmission mechanism for transferring vibrational motion of a haptic mass of haptic module 304 (e.g., the drive signal produced by haptic module 304), to acoustic resonator 602. Specifically, changes in air pressure caused by the vibrational motion of haptic module 304 displacing air in its surroundings (e.g., caused by movement of a distal end of a haptic drive shaft, or other structure in contact with air surrounding haptic module 304) can cause acoustic resonator 602 to undergo elastic deformation and vibrate with an amplitude, frequency, and/or duration based on the vibrational motion of haptic module 304 (e.g., the drive signal).

In some examples, acoustic resonator 602 can be connected to the cylindrical structure 600 along its circular boundary. As such, acoustic resonator 602 can be considered to serve as a diaphragm that vibrates with a frequency and/or amplitude based on the vibrations in the air between haptic module 304 and resonator 602 generated by the drive signal from haptic module 304. In some examples, acoustic resonator 602 can be exposed to the air external to the stylus at the cap portion of end/cap portion 302. However, in other examples, acoustic resonator 602 can be covered.

Figure 6C:
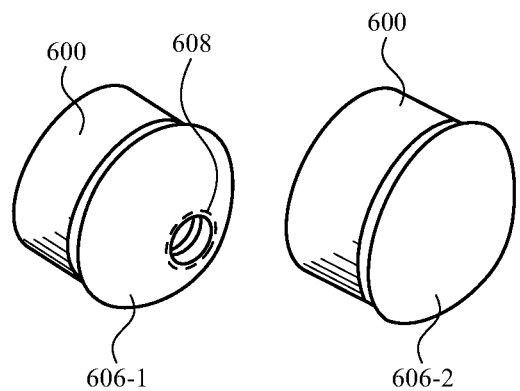
FIG. 6C illustrates views of an exemplary covering for a cap portion of an active stylus according to examples of the disclosure.

FIG. 6C illustrates views of exemplary coverings for a cap portion of an active stylus according to examples of the disclosure. The coverings of FIG. 6C are illustrated from the same perspective view shown in FIG. 6B. In other words, acoustic resonator 602 can be formed at the same relative location within cylindrical structure 600 illustrated in FIG. 6B, but is not visible because structure 600 is capped in FIG. 6C. Cap covering 606-1 can include an opening 608, illustrated as a circular opening on the left side of FIG. 6C. In some examples, opening 608 can have any shape/geometry, and can be a square, polygonal, or elliptical opening, for example, without departing from the scope of the disclosure. Opening 608 can allow for vibrations in the air generated at acoustic resonator 602 (e.g., vibrations of resonator 602 caused by a drive signal from haptic module 304) to emanate, and thereby be more audible to a target detector of an acoustic signal. Cap covering 606-2 does not include any opening, and fully covers cylindrical structure 600 and acoustic resonator 602. In general, opening 608 of cap covering 606-1 can improve the audibility of any vibrations in the air generated at acoustic resonator 602, thereby improving its acoustic performance relative to cap covering 606-2.

Figure 7A:
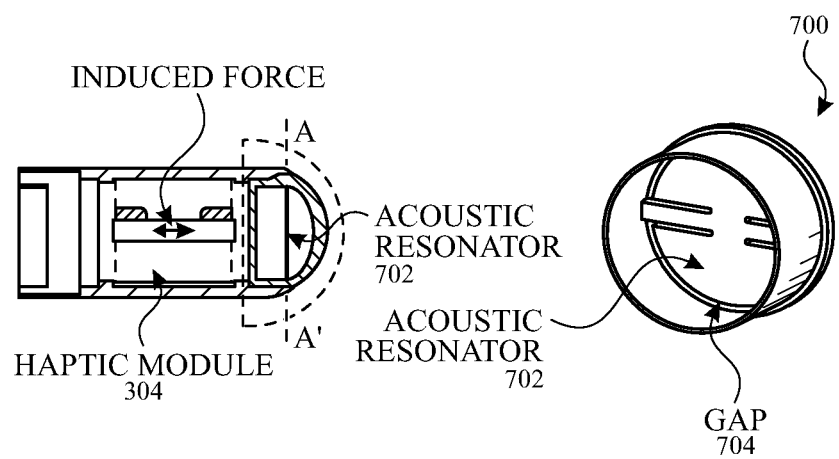
FIGS. 7A-7B illustrate views of an exemplary acoustic resonator integrated with a modified resonant diaphragm into a cap portion of an active stylus according to examples of the disclosure.

FIG. 7A illustrates views of an exemplary acoustic resonator with a modified resonant diaphragm integrated into a cap portion of an active stylus according to examples of the disclosure. Similar to the acoustic resonators 506, 508, 510, and 602 of FIGS. 5A-6B, acoustic resonator 702 can function as a diaphragm that undergoes elastic deformation to vibrate at a frequency based on a drive signal provided by haptic module 304. Specifically, haptic module 304 can vibrate a mass connected to a driveshaft between two ends (represented by dashed lines) along an axis labeled "induced force." These vibrations from haptic module 304 can serve as a drive signal that can cause acoustic resonators 506, 508, 510, and 602 FIGS. 5A-6B to vibrate and generate an acoustic signal at a specified frequency and/or amplitude for a specified duration (e.g., specified in a location request received at stylus 300 from another electronic device). The same vibrations from haptic module 304 can serve as a drive signal, which can cause acoustic resonator 702 to vibrate and generate an acoustic signal.

Acoustic resonator 702 can be connected to a subset of the cylindrical structure 700, rather than the entire cylindric structure. For example, FIG. 7A shows acoustic resonator 702 can be connected to the cylindrical structure 700 along only two sectors/portions of the circular boundary of structure 700. As illustrated, the two sectors/portions at which acoustic resonator 702 can be attached/connected to cylindrical structure 700 can be opposite one another (e.g., opposing ends of a diameter of cylindrical structure 700). A gap 704 extends along most of the circular boundary of cylindrical structure 700, such that acoustic resonator 702 is not attached to cylindrical structure 700 except at the two sectors/portions mentioned above. Similar to acoustic resonator 602, acoustic resonator 702 can serve as a diaphragm that vibrates with a frequency and/or amplitude based on the vibrations in cylindrical structure 700 generated by the drive signal from haptic module 304. In some examples, acoustic resonator 702 may, additionally or alternatively, vibrate with a frequency and/or amplitude based on vibrations in the air (e.g., an air gap) between haptic module 304 and resonator 702 generated by the drive signal from haptic module 304. Generally, an air gap between haptic module 304 and resonator 702 can be considered analogous to a transmission mechanism for transferring vibrational motion of a haptic mass of haptic module 304 (e.g., the drive signal produced by haptic module 304), to acoustic resonator 702. Specifically, changes in air pressure caused by the vibrational motion of haptic module 304 displacing air in its surroundings (e.g., caused by movement of a distal end of a haptic drive shaft, or other structure in contact with air surrounding haptic module 304) can cause acoustic resonator 702 to undergo elastic deformation and vibrate with an amplitude, frequency, and/or duration based on the vibrational motion of haptic module 304 (e.g., the drive signal). In some examples, acoustic resonator 702 can be exposed to the air at the cap portion of end/cap portion 302. However, in other examples, acoustic resonator 702 can be covered. In particular, acoustic resonator 702 can be covered with a cap covering 606-1 shown in FIG. 6C with an opening 608, or with a cap covering 606-2 shown in FIG. 6C without any openings.

Cylindrical structure 700 can have a cross-sectional geometry with a circular outer perimeter and a circular inner perimeter (e.g., the perimeter which acoustic resonator 702 is attached to, at two opposing ends corresponding to a diameter). In some examples however, cylindrical structure 700 has a different cross-sectional geometry. Specifically, a circular annulus of any cross-section of the un-capped cylindrical structure 700 can be replaced with any other suitable cross-sectional shape/geometry, and elongated such that it fills the dimensions of the structure as illustrated in the cross-sectional side view (e.g., the left side of FIG. 7A). As an example, a cross-section of structure 700 can have an elliptical or polygonal outer perimeter (or an outer perimeter that combines circular/elliptical and polygonal geometries), and an elliptical or polygonal inner perimeter (or an inner perimeter that combines circular/elliptical and polygonal geometries). In some examples, the outer perimeter of a cross-section of structure 700 can have the same geometry as an inner perimeter of a cross section of the outer housing of a stylus, or peripheral input device (e.g., structure 700 can be structurally configured to mate with a cavity in an end/cap region of the stylus or peripheral input device).

Figure 7B:
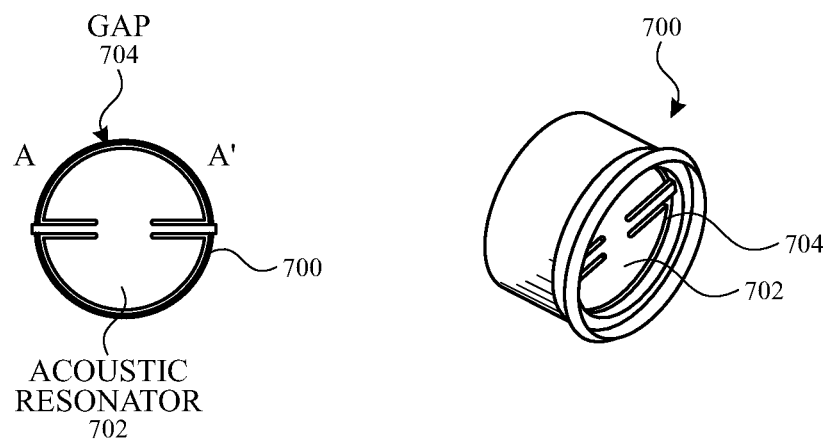

FIG. 7B illustrates a cross-sectional side view of the cap portion of FIG. 7A, along the A-A' axis on the left. As shown in this view, acoustic resonator 702 can be attached to cylindrical structure 700 (e.g., the circular outer boundary illustrated) at two sectors/portions that can be opposite one another (e.g., opposing ends of a diameter of cylindrical structure 700). FIG. 7B also illustrates another perspective view of cylindrical structure 700 with acoustic resonator 702 and gap 704.

Figure 8B:
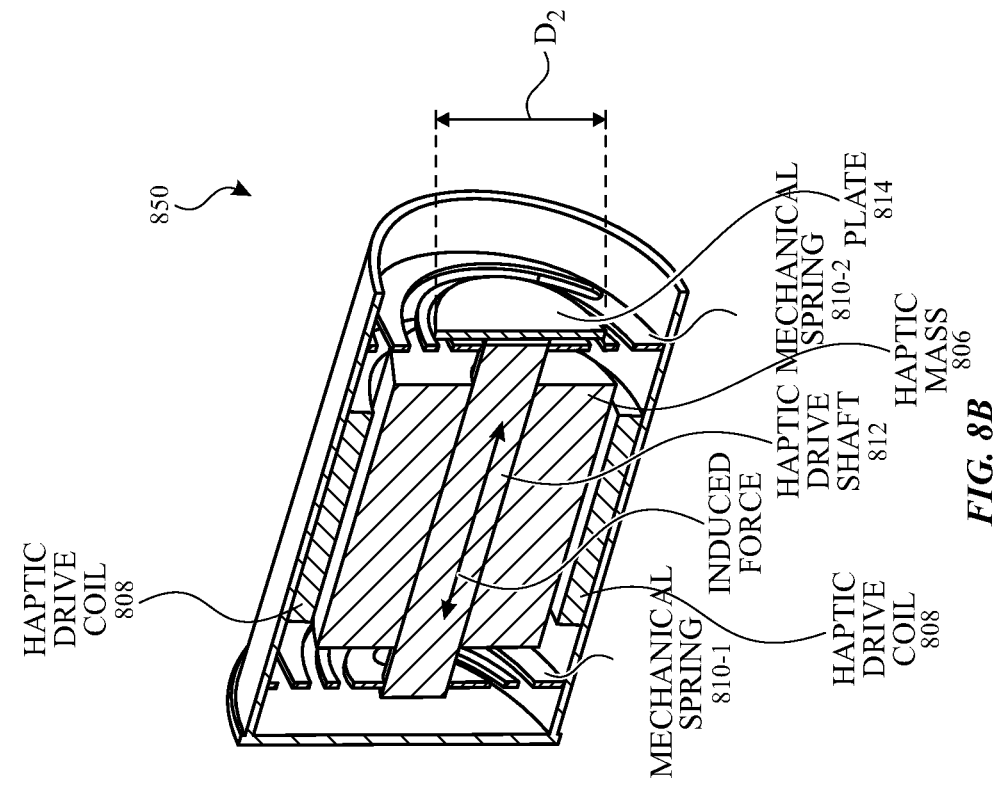
FIGS. 8A-8B illustrate cross-sectional perspective views of a haptic module of an active stylus according to examples of the disclosure.
Figure 8A:
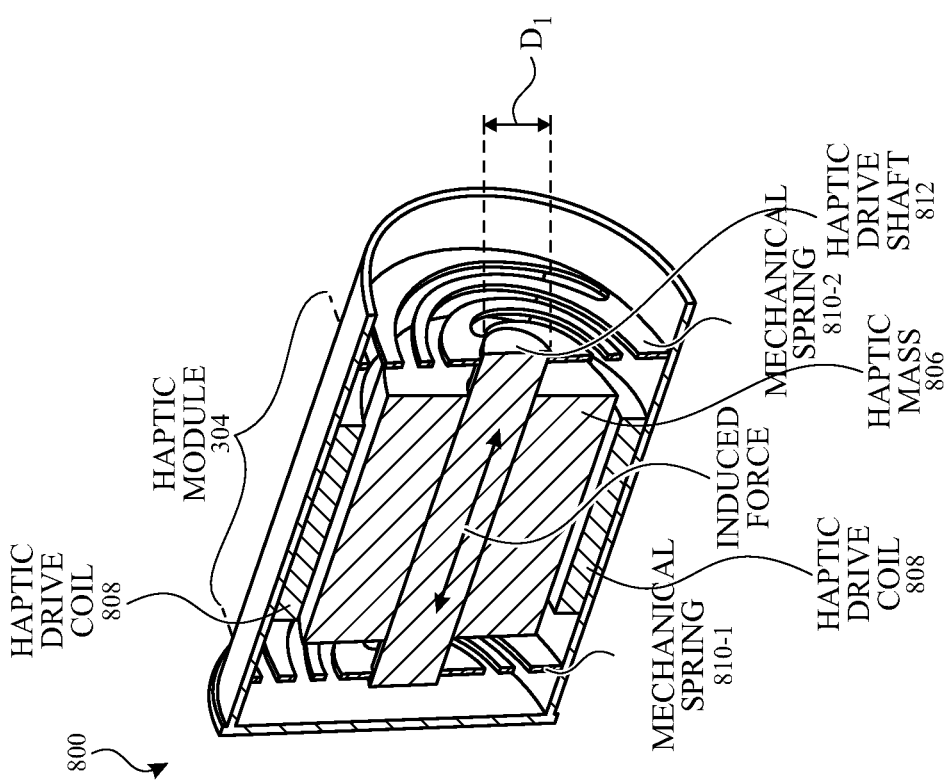

FIG. 8A illustrates a cross-sectional perspective view of a haptic module of an active stylus according to examples of the disclosure. Section 800 of end/cap portion 302 includes a haptic module 304 with a drive shaft 812. Haptic module 304, referenced above, can vibrate, or oscillate between two ends to generate vibrations. These vibrations, sometimes referred to as a drive signal, harmonic forcing signal, or a harmonic forcing impulse, can be transferred or transmitted to an acoustic resonator of a stylus (e.g., acoustic resonator(s) 303 of FIGS. 3, 506, 508, and 510 of FIGS. 5A-5F, 602 of FIG. 6, and/or 702 of FIG. 7). In some examples, such as in connection with acoustic resonators 506, 508, and 510 of FIGS. 5A-5F, haptic module 304 can be mechanically coupled to the resonators, and can transfers/transmits its vibrations (e.g., a drive signal) to the resonators through mechanical structures that intervene between the module and the resonators. In other examples, such as in connection with acoustic resonators 602 of FIGS. 6 and/or 702 of FIG. 7, haptic module 304 can vibrate surrounding air, and the vibrating air (e.g., a drive signal) can cause the resonators to vibrate.

Haptic module 304 can vibrate haptic mass 806 between two ends, illustrated by dashed lines (e.g., ends 532-1 and 532-2) in some of the drawings described above. These dashed lines can correspond to mechanical springs 810-1 and 810-2 (such as spiral coil springs) at opposing ends of haptic module 304. Haptic mass 806 can be vibrated within haptic module 304, and can include an integrated haptic drive shaft 812, which can contact the mechanical springs 810-1 and 810-2. An electromagnetic element (e.g., haptic drive coil 808) that surrounds an outer surface of haptic mass 806 with the integrated haptic drive shaft 812 can receive electrical signals that cause haptic mass 806, and shaft 812 to vibrate between mechanical springs 810-1 and 810-2 at a particular amplitude and/or frequency for a particular duration. In some examples, the structure of the resonant modes of haptic module 304 can be designed with separated frequency response peaks for haptic operation (e.g., within the example haptic frequency range described in connection with FIG. 4) and for acoustic operation (e.g., the example audible frequency range described in connection with FIG. 4). In some examples, such as when stylus 300 operates in a default mode, haptic module 304 can vibrate to produce haptic feedback. In some such examples, haptic module 304 can vibrate at frequencies below 500 Hz, such as at frequencies between 80 Hz and 300 Hz. However, this range is exemplary, and any other range of frequencies can be used to vibrate haptic module 304 in a manner that generates haptic feedback for a user of stylus 300. As previously discussed, a frequency response peak within the selected frequency range may be used to determine an operating frequency for haptic module 304 to provide improved/optimal haptic feedback for the user. For example, the frequency response peak within an example haptic frequency range of 100 Hz-300 Hz for haptic operation (e.g., when the stylus is operated in a haptic mode) can occur, or be observed at 136.7 Hz, or approximately 140 Hz. In such examples, operating haptic module 304 at approximately 140 Hz can result in improved/optimal haptic feedback for the user. In some examples, haptic feedback can be generated when a user performs a gesture with stylus 300 or selects a particular element displayed on a touch-sensitive surface of an electronic device with stylus 300 in the default mode of operating the stylus. In accordance with the description above, haptic module 304 can correspond to a linear resonant actuator (LRA), which can move haptic mass 806 in a reciprocal manner between two ends, based on electrical signals provided to a magnetic haptic drive coil 808 that surrounds the mass. In some examples, haptic mass 806 is magnetized (e.g., a permanent magnet), and haptic drive coil 808 receiving such electrical signals can cause haptic mass 806 (and haptic drive shaft 812) to travel in either direction along the axis labeled "induced force." In some examples, the electrical signals provided to haptic drive coil 808 are alternating current signals, or periodic signals (e.g., voltage pulses with a square, sinusoidal, sawtooth, or other shape, and any suitable duty cycle). In some examples, the electrical signals have an associated frequency and/or amplitude that can correspond to a desired frequency and/or amplitude of the acoustic resonator (e.g., the electrical signals used to cause vibrations at haptic module 304 can be based on the location request received at the peripheral input device, or stylus).

As mentioned above, the amplitude, frequency, phase, and/or duration of vibration can optionally be specified in a location request received at stylus 300 by another device (e.g., electronic device 220 of FIG. 2). Haptic module 304 can cause haptic mass 806 attached to haptic drive shaft 812 to oscillate in a manner such that acoustic resonators coupled to receive a drive signal from the haptic module vibrate with a specific frequency, amplitude, and/or duration (e.g., specified in the location request) corresponding to an acoustic signal that can be detected by a target detector. As another example, the frequency response peak within an example audible frequency range of 5.5 kHz-7 kHz for acoustic signal generation (e.g., when the stylus is operated in a beacon mode) can occur, or be observed at 6.2 kHz. In such examples, operating haptic module 304 at approximately 6.2 kHz can result in improved/optimal acoustic signal generation that is most audible for the user (and, in some examples, another electronic device).

Haptic module 304 can generate vibrations for a target detector that is a user or for a target detector that is an electronic device. As discussed above in connection with FIG. 4 above, different respective ranges of frequencies can be used based on the specified target detector. As discussed above in connection with FIG. 4. and FIG. 8A above, response peaks in haptic module 304 can be designed to target different ranges of frequencies based on the specified target detector. In addition to generating vibrations that can be mechanically transferred or transmitted to acoustic resonators such as 506, 508, and 510 of FIGS. 5A-5F (e.g., via intervening structures), haptic module 304 can vibrate surrounding air by its haptic drive shaft 812, as well as mechanical springs 810-1 and 810-2. Haptic drive shaft 812 can displace and vibrate air that contacts its surface area, which is illustrated as a circular region with a diameter $D_1$ (as well as the surface area of the spiral coil).

FIG. 8B illustrates a cross-sectional perspective view of a haptic module with an enlarged pressure plate coupled to its drive shaft according to examples of the disclosure. Section 850 of end/cap portion 302 includes haptic module 304 with a standard drive shaft coupled to an enlarged pressure plate. To increase the amount of air that can be displaced and vibrated by the motion of haptic drive shaft 812, enlarged pressure plate 814 can be secured to at least one end of haptic drive shaft 812, effectively increasing its surface area to a circular region with a diameter $D_2$ that is greater than $D_1$. By attaching or coupling plate 814 to haptic drive shaft 812, a larger amount of air can be displaced by the vibrations of haptic module 304. In some examples, plate 814 can be perforated. In such examples, plate 814 can include at least one perforation (e.g., a circular, elliptical, or polygonal perforation) that creates an opening through two opposing faces of plate 814. In examples where plate 814 includes multiple perforations, the perforations can be clustered around particular regions of the plate (e.g., regions that will displace less air, when moved in the direction of the induced force), or the perforations can be evenly distributed. As shown in FIGS. 8A and 8B, mechanical springs 810-1 and 810-2 can have spiral cutouts. In some examples, enlarged pressure plate 814 covers more of the cutouts than just haptic drive shaft 812, due to the larger diameter $D_2$ of plate 814 relative to the diameter $D_1$ of haptic drive shaft 812. To reduce, or otherwise adjust the area of air displaced by the movement of plate 814 in conjunction with motion of haptic drive shaft 812, one or more perforations can be incorporated into plate 814, as mentioned above. In other words, dimensions and/or density of perforations of plate 814 can influence the transmission of a drive signal generated by haptic module 304 through an air gap to cause acoustic resonators 602 and/or 702 to generate an acoustic signal. In addition to (or instead of) such perforations, plate 814 may be shaped in a manner that influences transmission of the drive signal, such as being flat, bent, conical, or formed in another shape.

Therefore, according to the above, some examples of the present disclosure are directed to a stylus comprising: a housing, one or more electrodes disposed at a first end of the housing, wireless communication circuitry, and an acoustic resonator disposed at a second end of the housing opposite the first end, wherein the acoustic resonator is configured to generate an acoustic signal in response to a request received by the wireless communication circuitry. Additionally or alternatively, in some examples, the stylus further comprises a haptic module coupled to the acoustic resonator, that is configured to generate a drive signal that causes the acoustic resonator to generate the acoustic signal. Additionally or alternatively, in some examples, the haptic module is mechanically coupled to the acoustic resonator via housing structures interposed between the haptic module and the acoustic resonator. Additionally or alternatively, in some examples, the haptic module is coupled to the acoustic resonator via an air gap between the haptic module and the acoustic resonator. Additionally or alternatively, in some examples, the haptic module comprises: a drive shaft, and a mass formed around the driveshaft, configured to vibrate along a direction of induced force between two opposing ends of the haptic module, wherein the vibration of the mass causes a surface area of the drive shaft to displace air within the housing. Additionally or alternatively, in some examples, the drive shaft has a first diameter, and the haptic module further comprises: a plate with a second diameter larger than the first diameter coupled to the surface area of the drive shaft, wherein the vibration of the mass causes a surface area of the plate to displace air within the housing. Additionally or alternatively, in some examples, the plate includes at least one perforation.

In some examples of the present disclosure, the housing comprises: an outer housing with a first thickness at the first end of the housing, wherein the acoustic resonator is formed from at least one portion of the outer housing at the second end of the housing with a second thickness that is less than the first thickness, and wherein the at least one portion comprises at least one part of an outer perimeter of the outer housing. Additionally or alternatively, in some examples, the housing comprises: an inner housing, and at least one air gap between the inner housing and the at least one portion of the outer housing. Additionally or alternatively, in some examples, the housing comprises: an outer housing that spans between the first end of the housing and the second end of the housing, and that is partitioned into a first portion corresponding to the first end, and a second portion corresponding to the second end, wherein the outer housing has a first thickness at the first portion, an inner housing that spans between the first end of the housing and the second end of the housing, a first air gap between the first portion of the outer housing and the inner housing, and a second air gap between the second portion of the outer housing and the inner housing, wherein the outer housing has a second thickness that is less than the first thickness at the second portion, and wherein the second air gap is between the acoustic resonator and the inner housing. Additionally or alternatively, in some examples, the first air gap and the second air gap are contiguous across a transition area beneath a boundary of the first portion and the second portion of the outer housing.

In some examples of the present disclosure, the housing comprises: an outer housing that spans between the first end of the housing and the second end of the housing, and that is partitioned into a first portion corresponding to the first end and a second portion corresponding to the second end, wherein the outer housing has a first thickness at the first portion, an inner housing that spans between the first end of the housing and the second end of the housing, wherein the inner housing contacts the outer housing at the first portion, and an air gap between the second portion of the outer housing and the inner housing, wherein the outer housing has a second thickness that is less than the first thickness at the second portion, and wherein the air gap is between the acoustic resonator and the inner housing. Additionally or alternatively, in some examples, the acoustic resonator is configured to generate the acoustic signal in response to receiving a drive signal. Additionally or alternatively, in some examples, the housing comprises: a cap portion at the second end of the housing, wherein the cap portion comprises an opening with a bounding perimeter. Additionally or alternatively, in some examples, the acoustic resonator comprises: a diaphragm attached to the cap portion along the bounding perimeter in its entirety. Additionally or alternatively, in some examples, the acoustic resonator comprises: a diaphragm attached to the cap portion at a first portion along the bounding perimeter of the opening and at a second portion along the bounding perimeter of the opening, wherein a gap separates the diaphragm from the cap portion at other portions along the bounding perimeter. Additionally or alternatively, in some examples, the acoustic resonator is configured to generate the acoustic signal at a specific frequency based on the request. Additionally or alternatively, in some examples, the specific frequency is selected from an audible range of frequencies associated with human hearing. Additionally or alternatively, in some examples, the specific frequency is selected from a sub-range of the audible range, corresponding to frequencies associated with elevated loudness perception. Additionally or alternatively, in some examples, the specific frequency is selected from a detectable range of frequencies associated with an acoustic transducer of an electronic device. Additionally or alternatively, in some examples, the specific frequency is selected from a sub-range of the detectable range corresponding to frequencies associated with low-noise detection by the acoustic transducer. Additionally or alternatively, in some examples, the specific frequency is outside an audible range of frequencies associated with human hearing. Additionally or alternatively, in some examples, the specific frequency is based on a target detector specified in the request. Additionally or alternatively, in some examples, the acoustic resonator is configured to generate the acoustic signal at a specific amplitude based on the request. Additionally or alternatively, in some examples, the acoustic resonator is configured to generate the acoustic signal for a specific duration based on the request. Additionally or alternatively, in some examples, the acoustic resonator is configured to generate the acoustic signal based on a target detector specified by the request.

Some examples are directed to a device comprising: one or more acoustic transducers, wireless communication circuitry configured to communicate with a peripheral device including an acoustic resonator, and processing circuitry coupled to the wireless communication circuitry and the one or more acoustic transducers, the processing circuitry configured to: cause the peripheral device to generate an acoustic signal using the acoustic resonator when the device is in communication with the peripheral device using the wireless communication circuitry, and detect the peripheral device is within a threshold distance of the device or estimate a location of the peripheral device relative to the device using the acoustic signal generated by the one or more acoustic resonator. Additionally or alternatively, in some examples, the peripheral device is a stylus. Additionally or alternatively, in some examples, the device of claim 1, further comprises: a touch-sensitive surface configured to receive input from the peripheral device. Additionally or alternatively, in some examples, the one or more acoustic transducers sense the acoustic signal at a given frequency and a given amplitude, the given frequency is based on a specified frequency selected by the processing circuitry, and the given amplitude is based on a specified amplitude selected by the processing circuitry. Additionally or alternatively, in some examples, the given frequency is a frequency lower than an audible frequency range associated with human hearing. Additionally or alternatively, in some examples, the given frequency is a frequency higher than an audible frequency range associated with human hearing. Additionally or alternatively, in some examples, the given frequency is a frequency within an audible frequency range associated with human hearing. Additionally or alternatively, in some examples, the processing circuitry compares the given amplitude to the specified amplitude or determines a difference between the given amplitude and the specified amplitude to detect the peripheral device is within the threshold distance of the device or estimate the location of the peripheral device relative to the device. Additionally or alternatively, in some examples, the processor is further configured to estimate the location of the peripheral device relative to the device based on the difference between the given amplitude and the specified amplitude, and further based on a sound propagation model that describes decay characteristics of the acoustic signal over multiple distances. Additionally or alternatively, in some examples, the processing circuitry detects the peripheral device is within the threshold distance of the device or estimates the location of the peripheral device relative to the device based on a comparison of multiple outputs from the one or more acoustic transducers. Additionally or alternatively, in some examples, the processing circuitry is further configured to: estimate a direction of the peripheral device relative to the device using multiple outputs from the one or more acoustic transducers, wherein at least a portion of the multiple outputs correspond to the acoustic signal generated by the acoustic resonator sensed by the one or more acoustic transducers, and wherein the one or more acoustic transducers are located at different respective locations within the device.

In some examples of the present disclosure, the processing circuitry is further configured to: generate a request that contains a specified frequency and a specified amplitude, and communicate the request to the processing circuitry to cause the peripheral device to generate the acoustic signal at the specified frequency and the specified amplitude. Additionally or alternatively, in some examples, at least one of the one or more acoustic transducers has a band of frequencies associated with improved sensing, wherein the processing circuitry is further configured to: automatically select a frequency within the band of frequencies associated with improved sensing. Additionally or alternatively, in some examples, the band of frequencies associated with improved sensing corresponds to frequencies that the one of the one or more acoustic transducers can sense at minimal power levels. Additionally or alternatively, in some examples, the band of frequencies associated with improved sensing corresponds to frequencies that the one of the one or more acoustic transducers can sense with minimal noise levels. Additionally or alternatively, in some examples, the band of frequencies associated with improved sensing corresponds to frequencies that the one of the one or more acoustic transducers can sense with maximal accuracy levels. Additionally or alternatively, in some examples, the processing circuitry is further configured to: select a user as a target detector for the acoustic signal. Additionally or alternatively, in some examples, the one or more acoustic transducers sense the acoustic signal at a given phase, wherein the given phase is based on a specified phase selected by the processing circuitry. Additionally or alternatively, in some examples, the processing circuitry compares the given phase to the specified phase or determines a difference between the given phase and the specified phase to detect the peripheral device is within the threshold distance of the device or estimate the location of the peripheral device relative to the device. Additionally or alternatively, in some examples, the processor is further configured to estimate the location of the peripheral device relative to the device based on the difference between the given phase and the specified phase, and further based on trilateration or multilateration. Additionally or alternatively, in some examples, the processing circuitry is further configured to estimate the location of the peripheral device relative to the device based on the difference between the given phase and the specified phase, and further based on time of arrival or time difference of arrival. Additionally or alternatively, in some examples, the one or more acoustic transducers measure the acoustic signal in a time domain, wherein the processing circuitry transforms the acoustic signal measured in the time domain to a frequency domain, and wherein the processing circuitry is configured to analyze the acoustic signal in the frequency domain to detect the peripheral device is within the threshold distance of the device or estimate the location of the peripheral device relative to the device. Additionally or alternatively, in some examples, the processing circuitry is configured to analyze the acoustic signal in the frequency domain to estimate a velocity of the peripheral device relative to the device based on the frequency of arrival or frequency difference of arrival.

Some examples are directed to a method comprising: at an electronic device including wireless communication circuitry: generating a location request for a peripheral device, and sending the location request to the peripheral device using the wireless communication circuitry, and at the peripheral device including an acoustic resonator: receiving the location request, and in response to receiving the location request, generating an acoustic signal using the acoustic resonator. Additionally or alternatively, in some examples, generating the location request comprises: at the electronic device: selecting a target detector, and selecting a frequency for the acoustic signal based on the target detector, selecting an amplitude for the acoustic signal based on the target detector, and including the selected frequency and the selected amplitude into the location request. Additionally or alternatively, in some examples, the method further comprises selecting a user as the target detector, and selecting an audible frequency from within a range of frequencies associated with human hearing as the frequency for the acoustic signal. Additionally or alternatively, in some examples, the method further comprises: selecting the electronic device as the target detector, and selecting a sensing frequency from within a range of frequencies associated with improved sensing at the electronic device. Additionally or alternatively, in some examples, the method further comprises: at the electronic device, further including one or more acoustic transducers: measuring the acoustic signal generated by the peripheral device using at least one of the one or more acoustic transducers, and detecting the peripheral device is within a threshold distance of the device or estimating a location of the peripheral device relative to the device based on the acoustic signal measured by the at least one of the one or more acoustic transducers. Additionally or alternatively, in some examples, estimating the location of the peripheral device comprises: at the electronic device, further including memory: retrieving a first amplitude value specified in the location request from the memory, determining a second amplitude value associated with the acoustic signal measured by the at least one of the one or more acoustic transducers, and estimating that the peripheral device is located an estimated particular distance away from the electronic device, based on a comparison of the first amplitude value to the second amplitude value. Additionally or alternatively, in some examples, estimating that the peripheral device is located the particular distance away from the electronic device comprises: at the electronic device: retrieving a sound propagation model from the memory, and determining the particular distance based on the sound propagation model, the first amplitude value, and the second amplitude value. Additionally or alternatively, in some examples, estimating the location of the peripheral device comprises: estimating a direction of the peripheral device relative to the electronic device, and determining a relative location of the peripheral device based on the estimated particular distance and the estimated direction. Additionally or alternatively, in some examples, the measuring the acoustic signal generated by the peripheral device using at least one of the one or more acoustic transducers comprises measuring the acoustic signal using a first acoustic transducer of the one or more acoustic transducers, the method further comprising: measuring the acoustic signal generated by the peripheral device using a second acoustic transducer of the one or more acoustic transducers, and estimating a direction of the peripheral device relative to the electronic device, based on the acoustic signal measured using the first acoustic transducer of the one or more acoustic transducers, and the acoustic signal measured using the second acoustic transducer of the one or more acoustic transducers.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. A stylus comprising:
   a housing;
   one or more electrodes disposed at a first end of the housing;
   wireless communication circuitry;
   a haptic module; and
   an acoustic resonator disposed at a second end of the housing opposite the first end and coupled to the haptic module; wherein the haptic module is configured to generate a drive signal in response to a request received by the wireless communication circuitry that causes the acoustic resonator to generate an acoustic signal, and the acoustic resonator is configured to generate the acoustic signal in response to the request received by the wireless communication circuitry.

2. The stylus of claim 1, wherein the haptic module is mechanically coupled to the acoustic resonator via housing structures interposed between the haptic module and the acoustic resonator.

3. The stylus of claim 1, wherein the haptic module comprises:
   a drive shaft; and
   a mass formed around the drive shaft, configured to vibrate along a direction of induced force between two opposing ends of the haptic module, wherein a vibration of the mass causes a surface area of the drive shaft to displace air within the housing.

4. The stylus of claim 3, wherein the drive shaft has a first diameter, and wherein the haptic module further comprises:
   a plate with a second diameter larger than the first diameter coupled to the surface area of the drive shaft, wherein the vibration of the mass causes a surface area of the plate to displace air within the housing.

5. The stylus of claim 1, wherein the housing comprises:
   an outer housing with a first thickness at the first end of the housing, wherein the acoustic resonator is formed from at least one portion of the outer housing at the second end of the housing with a second thickness that is less than the first thickness, wherein the at least one portion comprises at least one part of an outer perimeter of the outer housing.

6. The stylus of claim 1, wherein the housing comprises:
an outer housing that spans between the first end of the housing and the second end of the housing, and that is partitioned into a first portion corresponding to the first end, and a second portion corresponding to the second end, wherein the outer housing has a first thickness at the first portion;
an inner housing that spans between the first end of the housing and the second end of the housing;
a first air gap between the first portion of the outer housing and the inner housing; and
a second air gap between the second portion of the outer housing and the inner housing, wherein the outer housing has a second thickness that is less than the first thickness at the second portion, and wherein the second air gap is between the acoustic resonator and the inner housing.

7. The stylus of claim 1, wherein the acoustic resonator is configured to generate the acoustic signal in response to receiving a drive signal.

8. The stylus of claim 1, wherein the acoustic resonator comprises:
a diaphragm attached to a cap portion of the housing at the second end of the housing, wherein the diaphragm is attached along at least a portion of a bounding perimeter of the cap portion.

9. The stylus of claim 1, wherein the acoustic resonator is configured to generate the acoustic signal at a specific frequency, a specific amplitude, or for a specific duration based on the request.

10. A device comprising:
one or more acoustic transducers;
wireless communication circuitry configured to communicate with a stylus including an acoustic resonator; and
processing circuitry coupled to the wireless communication circuitry and the one or more acoustic transducers, the processing circuitry configured to:
cause the stylus to generate an acoustic signal using the acoustic resonator when the device is in communication with the stylus using the wireless communication circuitry; and
detect that the stylus is within a threshold distance of the device or estimate a location of the stylus relative to the device using the acoustic signal generated by the acoustic resonator.

11. The device of claim 10, further comprising:
A touch-sensitive surface configured to receive input from the stylus.

12. The device of claim 10, wherein the one or more acoustic transducers sense the acoustic signal at a given frequency and a given amplitude, wherein the given frequency is based on a specified frequency selected by the processing circuitry, and wherein the given amplitude is based on a specified amplitude selected by the processing circuitry.

13. The device of claim 10, wherein the processing circuitry detects the stylus is within the threshold distance of the device or estimates the location of the stylus relative to the device based on a comparison of multiple outputs from the one or more acoustic transducers.

14. The device of claim 10, wherein the processing circuitry is further configured to:
estimate a direction of the stylus relative to the device using multiple outputs from the one or more acoustic transducers, wherein at least a portion of the multiple outputs correspond to the acoustic signal generated by the acoustic resonator sensed by the one or more acoustic transducers, and wherein the one or more acoustic transducers are located at different respective locations within the device.

15. The device of claim 10, wherein the processing circuitry is further configured to:
generate a request that contains a specified frequency and a specified amplitude; and
communicate the request to the processing circuitry to cause the stylus to generate the acoustic signal at the specified frequency and the specified amplitude.

16. A method comprising:
at an electronic device including wireless communication circuitry:
generating a location request for a peripheral device; and
sending the location request to the peripheral device using the wireless communication circuitry; and
at the peripheral device including an acoustic resonator:
receiving the location request; and
in response to receiving the location request, generating an acoustic signal using the acoustic resonator.

17. The method of claim 16, wherein generating the location request comprises:
at the electronic device:
selecting a target detector;
selecting a frequency for the acoustic signal based on the target detector;
selecting an amplitude for the acoustic signal based on the target detector; and
including the selected frequency and the selected amplitude into the location request.

18. The method of claim 16, further comprising:
at the electronic device, further including one or more acoustic transducers:
measuring the acoustic signal generated by the peripheral device using at least one of the one or more acoustic transducers; and
detecting the peripheral device is within a threshold distance of the device or estimating a location of the peripheral device relative to the device based on the acoustic signal measured by the at least one of the one or more acoustic transducers.

19. The method of claim 18, wherein estimating the location of the peripheral device comprises:
at the electronic device, further including memory:
retrieving a first amplitude value specified in the location request from the memory;
determining a second amplitude value associated with the acoustic signal measured by the at least one of the one or more acoustic transducers; and
estimating that the peripheral device is located an estimated particular distance away from the electronic device, based on a comparison of the first amplitude value to the second amplitude value.

20. The method of claim 19, wherein estimating that the peripheral device is located the particular distance away from the electronic device comprises:
at the electronic device:
retrieving a sound propagation model from the memory; and
determining the particular distance based on the sound propagation model, the first amplitude value, and the second amplitude value.

* * * * *